(12) United States Patent
Irwin et al.

(10) Patent No.: US 12,600,466 B2
(45) Date of Patent: Apr. 14, 2026

(54) LANDING GEAR ASSEMBLIES, ROTORCRAFT AND ROTORCRAFT METHODS

(71) Applicant: The Boeing Company, Arlington, VA (US)

(72) Inventors: Joseph G. Irwin, Landenberg, PA (US); Alex Schonfeld, Wallingford, PA (US); Andrew Leung, Philadelphia, PA (US)

(73) Assignee: The Boeing Company, Arlington, VA (US)

( * ) Notice: Subject to any disclaimer, the term of this patent is extended or adjusted under 35 U.S.C. 154(b) by 238 days.

(21) Appl. No.: 18/475,794

(22) Filed: Sep. 27, 2023

(65) Prior Publication Data

US 2025/0100678 A1 Mar. 27, 2025

(51) Int. Cl.
| | |
|---|---|
| *B64C 25/10* | (2006.01) |
| *B64C 25/32* | (2006.01) |
| *B64C 25/58* | (2006.01) |
| *B64F 5/60* | (2017.01) |

(52) U.S. Cl.
CPC .............. *B64C 25/10* (2013.01); *B64C 25/58* (2013.01); *B64F 5/60* (2017.01); *B64C 2025/325* (2013.01)

(58) Field of Classification Search
CPC ... B64C 25/10; B64C 25/58; B64C 2025/325; B64C 25/34; B64C 25/60; B64F 5/60; B64D 2045/0085
See application file for complete search history.

(56) References Cited

U.S. PATENT DOCUMENTS

| | | | | |
|---|---|---|---|---|
| 9,354,635 | B2 | 5/2016 | Shue | |
| 10,676,177 | B1 * | 6/2020 | Costello | B64C 25/001 |
| 10,689,098 | B2 * | 6/2020 | Waltner | B64C 25/60 |
| 10,732,023 | B2 * | 8/2020 | Mastrianni | G01G 19/12 |
| 11,230,372 | B1 * | 1/2022 | Griffin | B64C 25/34 |
| 11,320,333 | B2 | 5/2022 | Reber et al. | |
| 2007/0205326 | A1 * | 9/2007 | Waide | B64C 29/0033 |
| | | | | 244/104 R |

(Continued)

OTHER PUBLICATIONS

European Patent Office, Extended European Search Report, App. No. 24188686.0 (Oct. 1, 2024).

*Primary Examiner* — Donald J Wallace
*Assistant Examiner* — Jalal C Coduroglu
(74) *Attorney, Agent, or Firm* — Walters & Wasylyna LLC

(57) ABSTRACT

A landing gear assembly for rotorcraft includes a shock absorber, a ground support assembly and an airframe linkage assembly. The shock absorber includes a force sensor to detect a pressure of an incompressible fluid within the shock absorber and a temperature sensor to detect a temperature of the fluid. The ground support assembly is linked to the shock absorber and includes an axle and a ground contact element movable in relation to the axle. The linkage assembly is linked to the shock absorber and/or the ground support assembly and includes a position sensor to detect movement of the axle between compressed and uncompressed conditions of the shock absorber. Various rotorcraft include one, two, three or more landing gear assemblies and an attitude control system. Various rotorcraft methods process sensor signals from one, two, three or more landing gear assemblies at the attitude control system to provide various rotorcraft functions.

20 Claims, 30 Drawing Sheets

(56)  References Cited

U.S. PATENT DOCUMENTS

| | | | |
|---|---|---|---|
| 2016/0207616 A1* | 7/2016 | Lindahl | B64C 25/22 |
| 2017/0068252 A1* | 3/2017 | Yu | G05D 1/0858 |
| 2018/0290734 A1* | 10/2018 | Mellor | B64C 25/34 |
| 2019/0332125 A1 | 10/2019 | Irwin, III et al. | |
| 2020/0062385 A1* | 2/2020 | Randall | B64C 29/02 |
| 2020/0148336 A1* | 5/2020 | Akiba | B64C 25/06 |
| 2022/0011189 A1* | 1/2022 | Reber | G01M 1/127 |
| 2023/0133313 A1* | 5/2023 | Boyer | G01L 5/0052 |
| | | | 244/103 R |
| 2025/0085195 A1* | 3/2025 | Long | G01M 1/125 |

* cited by examiner

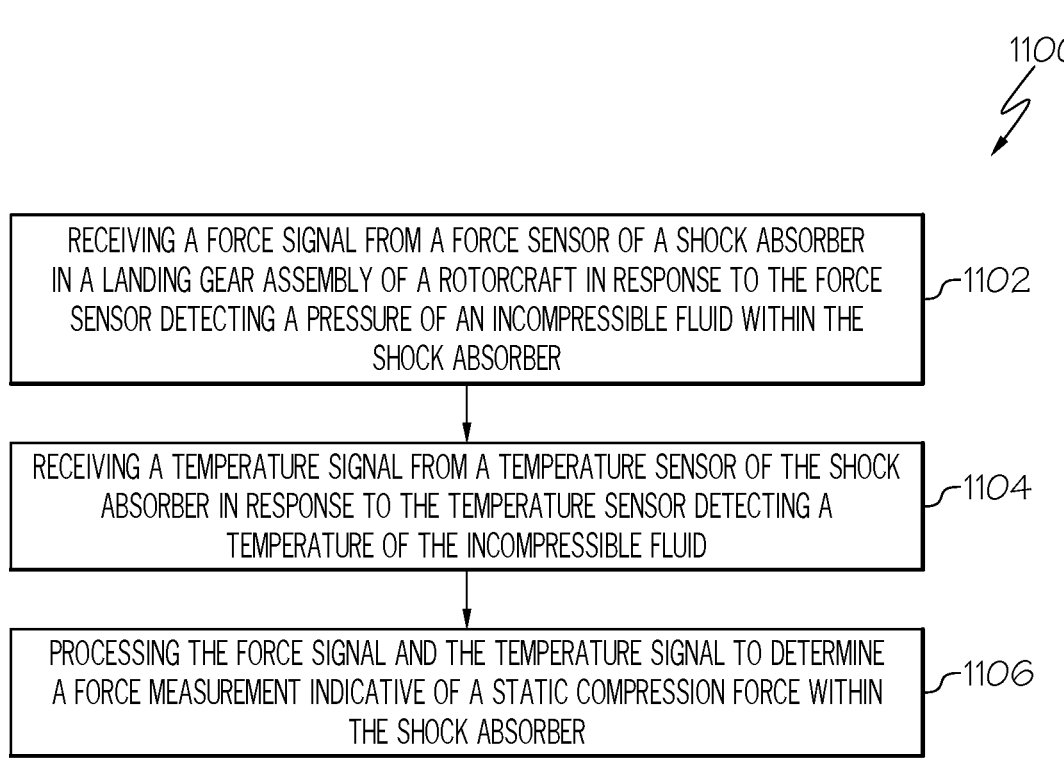

1100

RECEIVING A FORCE SIGNAL FROM A FORCE SENSOR OF A SHOCK ABSORBER IN A LANDING GEAR ASSEMBLY OF A ROTORCRAFT IN RESPONSE TO THE FORCE SENSOR DETECTING A PRESSURE OF AN INCOMPRESSIBLE FLUID WITHIN THE SHOCK ABSORBER — 1102

RECEIVING A TEMPERATURE SIGNAL FROM A TEMPERATURE SENSOR OF THE SHOCK ABSORBER IN RESPONSE TO THE TEMPERATURE SENSOR DETECTING A TEMPERATURE OF THE INCOMPRESSIBLE FLUID — 1104

PROCESSING THE FORCE SIGNAL AND THE TEMPERATURE SIGNAL TO DETERMINE A FORCE MEASUREMENT INDICATIVE OF A STATIC COMPRESSION FORCE WITHIN THE SHOCK ABSORBER — 1106

DETERMINING A SERIES OF FORCE MEASUREMENTS DURING A
TAKEOFF SEQUENCE OR A LANDING SEQUENCE BY THE ROTOCRAFT          1202

COMPARING THE SERIES OF FORCE MEASUREMENTS TO A PREDETERMINED
FORCE CHARACTERISTIC FOR THE LANDING GEAR ASSEMBLY          1204

DETERMINING A HEALTH CONDITION OF THE LANDING GEAR ASSEMBLY
BASED AT LEAST IN PART ON THE COMPARING          1206

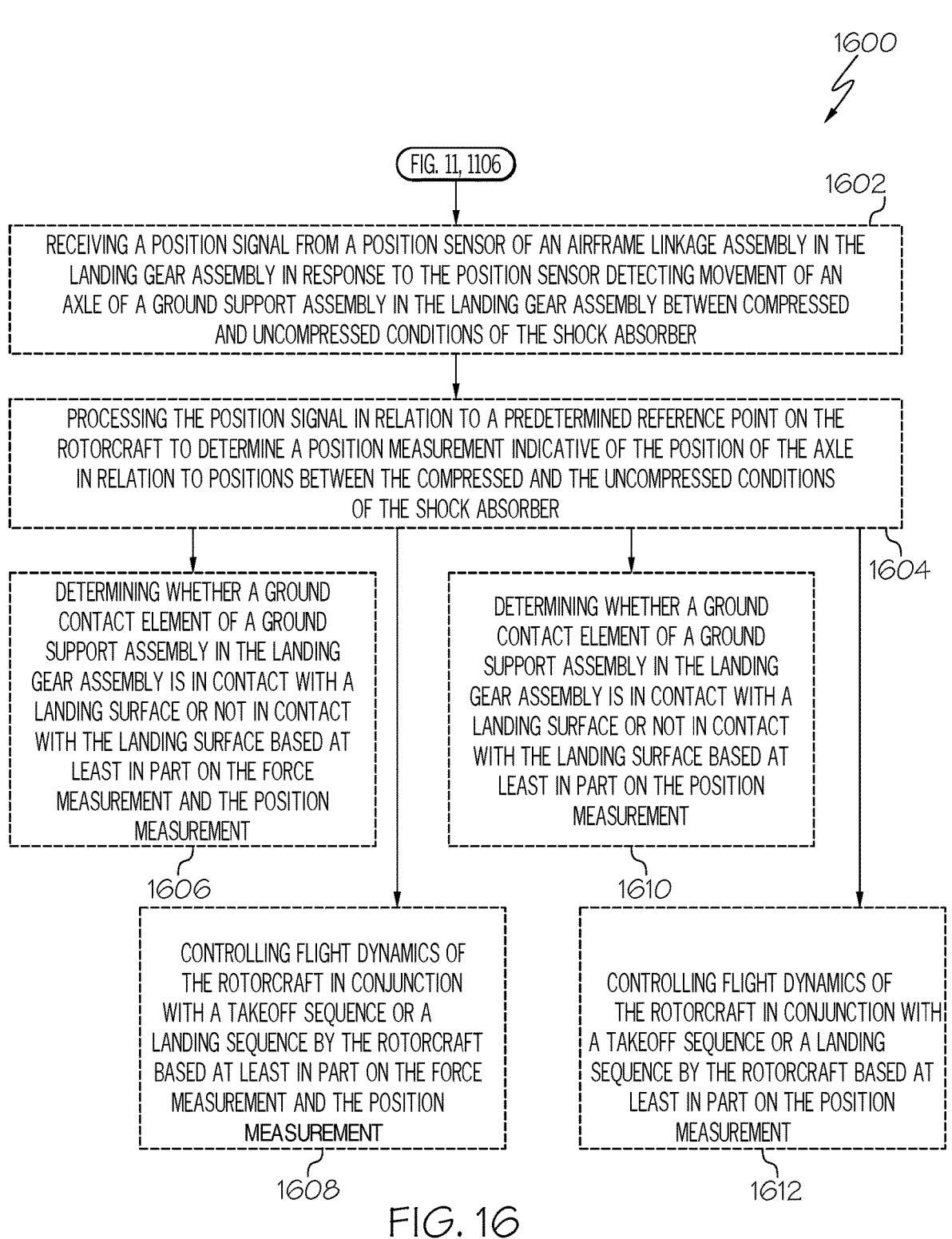

RECEIVING A POSITION SIGNAL FROM A POSITION SENSOR OF AN AIRFRAME LINKAGE ASSEMBLY IN THE LANDING GEAR ASSEMBLY IN RESPONSE TO THE POSITION SENSOR DETECTING MOVEMENT OF AN AXLE OF A GROUND SUPPORT ASSEMBLY IN THE LANDING GEAR ASSEMBLY BETWEEN COMPRESSED AND UNCOMPRESSED CONDITIONS OF THE SHOCK ABSORBER

PROCESSING THE POSITION SIGNAL IN RELATION TO A PREDETERMINED REFERENCE POINT ON THE ROTORCRAFT TO DETERMINE A POSITION MEASUREMENT INDICATIVE OF THE POSITION OF THE AXLE IN RELATION TO POSITIONS BETWEEN THE COMPRESSED AND THE UNCOMPRESSED CONDITIONS OF THE SHOCK ABSORBER

1604

DETERMINING WHETHER A GROUND CONTACT ELEMENT OF A GROUND SUPPORT ASSEMBLY IN THE LANDING GEAR ASSEMBLY IS IN CONTACT WITH A LANDING SURFACE OR NOT IN CONTACT WITH THE LANDING SURFACE BASED AT LEAST IN PART ON THE FORCE MEASUREMENT AND THE POSITION MEASUREMENT

1606

DETERMINING WHETHER A GROUND CONTACT ELEMENT OF A GROUND SUPPORT ASSEMBLY IN THE LANDING GEAR ASSEMBLY IS IN CONTACT WITH A LANDING SURFACE OR NOT IN CONTACT WITH THE LANDING SURFACE BASED AT LEAST IN PART ON THE POSITION MEASUREMENT

1610

CONTROLLING FLIGHT DYNAMICS OF THE ROTORCRAFT IN CONJUNCTION WITH A TAKEOFF SEQUENCE OR A LANDING SEQUENCE BY THE ROTORCRAFT BASED AT LEAST IN PART ON THE FORCE MEASUREMENT AND THE POSITION MEASUREMENT

1608

CONTROLLING FLIGHT DYNAMICS OF THE ROTORCRAFT IN CONJUNCTION WITH A TAKEOFF SEQUENCE OR A LANDING SEQUENCE BY THE ROTORCRAFT BASED AT LEAST IN PART ON THE POSITION MEASUREMENT

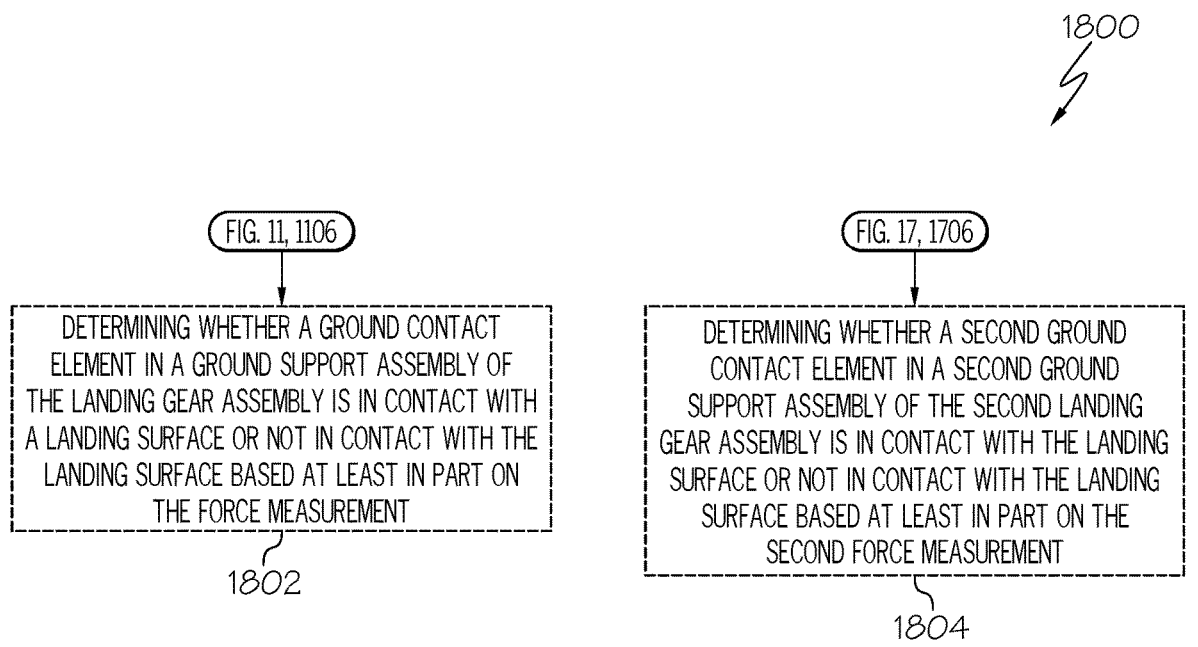

FIG. 11, 1106

DETERMINING WHETHER A GROUND CONTACT ELEMENT IN A GROUND SUPPORT ASSEMBLY OF THE LANDING GEAR ASSEMBLY IS IN CONTACT WITH A LANDING SURFACE OR NOT IN CONTACT WITH THE LANDING SURFACE BASED AT LEAST IN PART ON THE FORCE MEASUREMENT

DETERMINING WHETHER A SECOND GROUND CONTACT ELEMENT IN A SECOND GROUND SUPPORT ASSEMBLY OF THE SECOND LANDING GEAR ASSEMBLY IS IN CONTACT WITH THE LANDING SURFACE OR NOT IN CONTACT WITH THE LANDING SURFACE BASED AT LEAST IN PART ON THE SECOND FORCE MEASUREMENT

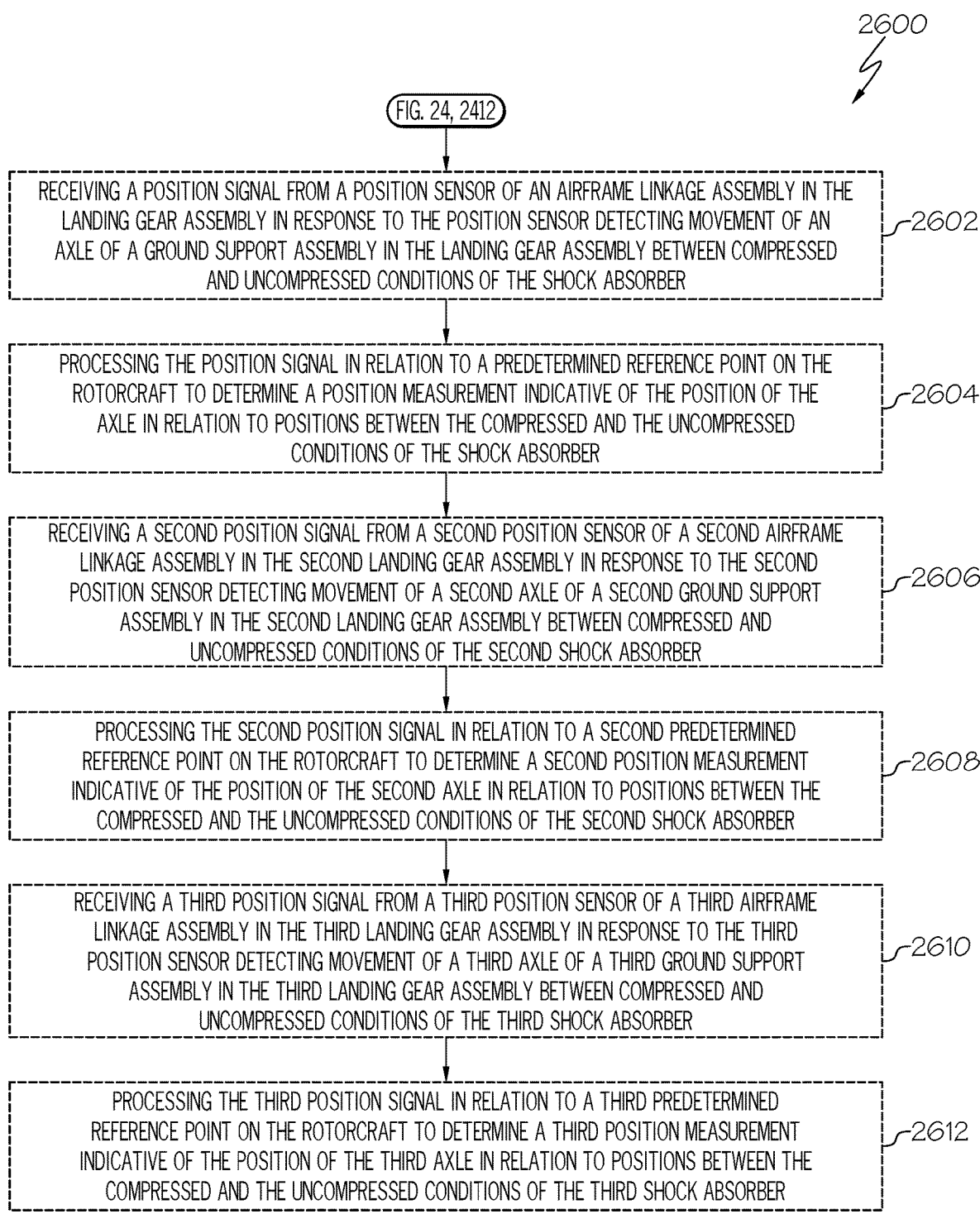

RECEIVING A POSITION SIGNAL FROM A POSITION SENSOR OF AN AIRFRAME LINKAGE ASSEMBLY IN THE LANDING GEAR ASSEMBLY IN RESPONSE TO THE POSITION SENSOR DETECTING MOVEMENT OF AN AXLE OF A GROUND SUPPORT ASSEMBLY IN THE LANDING GEAR ASSEMBLY BETWEEN COMPRESSED AND UNCOMPRESSED CONDITIONS OF THE SHOCK ABSORBER — 2602

PROCESSING THE POSITION SIGNAL IN RELATION TO A PREDETERMINED REFERENCE POINT ON THE ROTORCRAFT TO DETERMINE A POSITION MEASUREMENT INDICATIVE OF THE POSITION OF THE AXLE IN RELATION TO POSITIONS BETWEEN THE COMPRESSED AND THE UNCOMPRESSED CONDITIONS OF THE SHOCK ABSORBER — 2604

RECEIVING A SECOND POSITION SIGNAL FROM A SECOND POSITION SENSOR OF A SECOND AIRFRAME LINKAGE ASSEMBLY IN THE SECOND LANDING GEAR ASSEMBLY IN RESPONSE TO THE SECOND POSITION SENSOR DETECTING MOVEMENT OF A SECOND AXLE OF A SECOND GROUND SUPPORT ASSEMBLY IN THE SECOND LANDING GEAR ASSEMBLY BETWEEN COMPRESSED AND UNCOMPRESSED CONDITIONS OF THE SECOND SHOCK ABSORBER — 2606

PROCESSING THE SECOND POSITION SIGNAL IN RELATION TO A SECOND PREDETERMINED REFERENCE POINT ON THE ROTORCRAFT TO DETERMINE A SECOND POSITION MEASUREMENT INDICATIVE OF THE POSITION OF THE SECOND AXLE IN RELATION TO POSITIONS BETWEEN THE COMPRESSED AND THE UNCOMPRESSED CONDITIONS OF THE SECOND SHOCK ABSORBER — 2608

RECEIVING A THIRD POSITION SIGNAL FROM A THIRD POSITION SENSOR OF A THIRD AIRFRAME LINKAGE ASSEMBLY IN THE THIRD LANDING GEAR ASSEMBLY IN RESPONSE TO THE THIRD POSITION SENSOR DETECTING MOVEMENT OF A THIRD AXLE OF A THIRD GROUND SUPPORT ASSEMBLY IN THE THIRD LANDING GEAR ASSEMBLY BETWEEN COMPRESSED AND UNCOMPRESSED CONDITIONS OF THE THIRD SHOCK ABSORBER — 2610

PROCESSING THE THIRD POSITION SIGNAL IN RELATION TO A THIRD PREDETERMINED REFERENCE POINT ON THE ROTORCRAFT TO DETERMINE A THIRD POSITION MEASUREMENT INDICATIVE OF THE POSITION OF THE THIRD AXLE IN RELATION TO POSITIONS BETWEEN THE COMPRESSED AND THE UNCOMPRESSED CONDITIONS OF THE THIRD SHOCK ABSORBER — 2612

FIG. 26

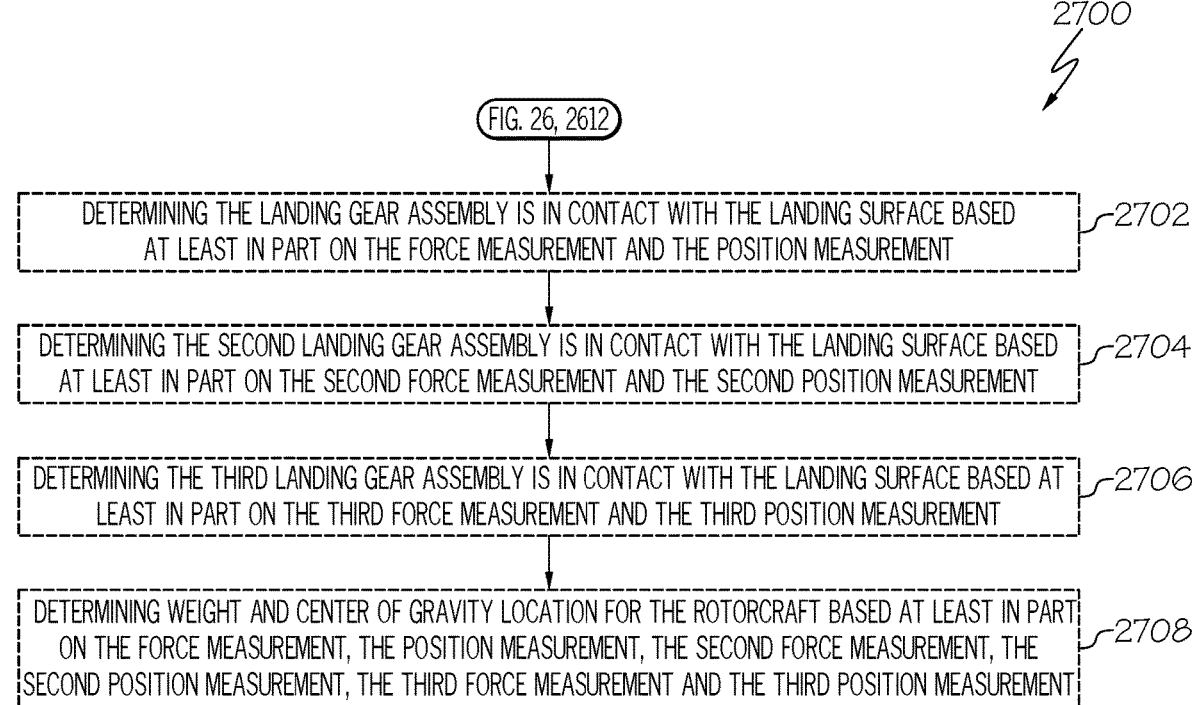

DETERMINING THE LANDING GEAR ASSEMBLY IS IN CONTACT WITH THE LANDING SURFACE BASED AT LEAST IN PART ON THE FORCE MEASUREMENT AND THE POSITION MEASUREMENT ⟋2702

DETERMINING THE SECOND LANDING GEAR ASSEMBLY IS IN CONTACT WITH THE LANDING SURFACE BASED AT LEAST IN PART ON THE SECOND FORCE MEASUREMENT AND THE SECOND POSITION MEASUREMENT ⟋2704

DETERMINING THE THIRD LANDING GEAR ASSEMBLY IS IN CONTACT WITH THE LANDING SURFACE BASED AT LEAST IN PART ON THE THIRD FORCE MEASUREMENT AND THE THIRD POSITION MEASUREMENT ⟋2706

DETERMINING WEIGHT AND CENTER OF GRAVITY LOCATION FOR THE ROTORCRAFT BASED AT LEAST IN PART ON THE FORCE MEASUREMENT, THE POSITION MEASUREMENT, THE SECOND FORCE MEASUREMENT, THE SECOND POSITION MEASUREMENT, THE THIRD FORCE MEASUREMENT AND THE THIRD POSITION MEASUREMENT ⟋2708

FIG. 27

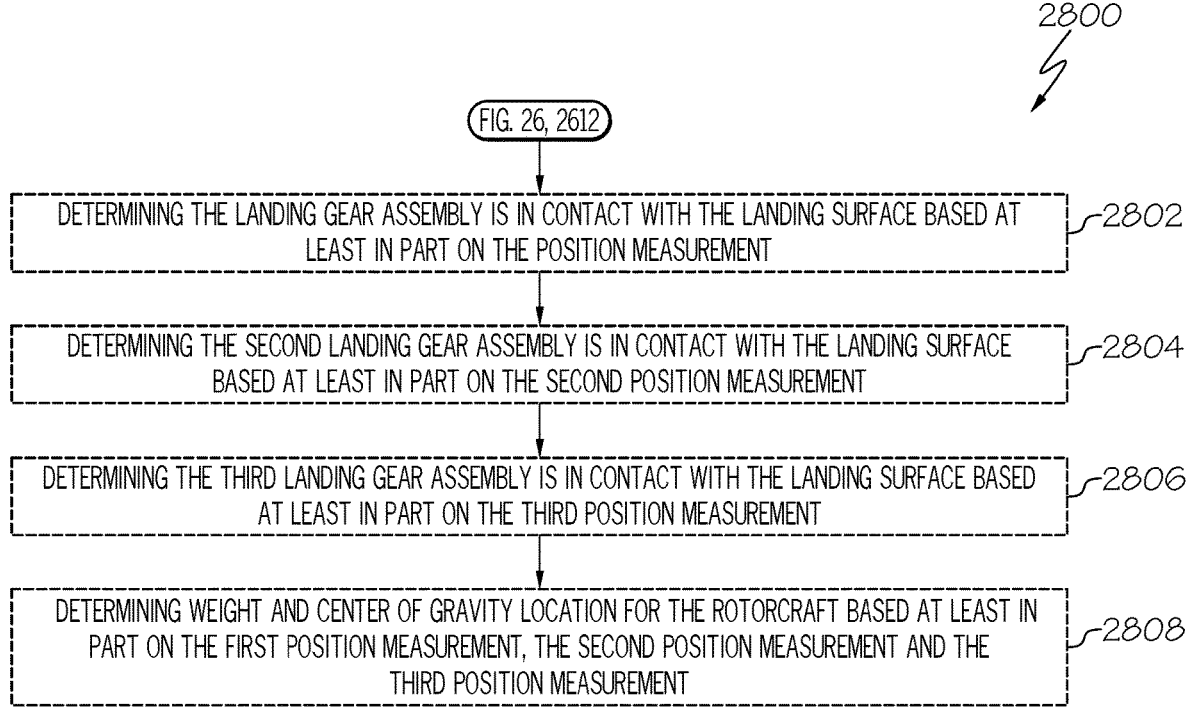

DETERMINING THE LANDING GEAR ASSEMBLY IS IN CONTACT WITH THE LANDING SURFACE BASED AT LEAST IN PART ON THE POSITION MEASUREMENT — 2802

DETERMINING THE SECOND LANDING GEAR ASSEMBLY IS IN CONTACT WITH THE LANDING SURFACE BASED AT LEAST IN PART ON THE SECOND POSITION MEASUREMENT — 2804

DETERMINING THE THIRD LANDING GEAR ASSEMBLY IS IN CONTACT WITH THE LANDING SURFACE BASED AT LEAST IN PART ON THE THIRD POSITION MEASUREMENT — 2806

DETERMINING WEIGHT AND CENTER OF GRAVITY LOCATION FOR THE ROTORCRAFT BASED AT LEAST IN PART ON THE FIRST POSITION MEASUREMENT, THE SECOND POSITION MEASUREMENT AND THE THIRD POSITION MEASUREMENT — 2808

FIG. 28

LANDING GEAR ASSEMBLIES, ROTORCRAFT AND ROTORCRAFT METHODS

GOVERNMENT CONTRACT

This invention was made with Government support under a contract (W9124P-19-9-0001 AMTC 19-08-024) awarded by the Department of Defense. The government has certain rights in this invention.

FIELD

The present disclosure relates generally to a landing gear assembly for rotorcraft and, particularly, to landing gear sensors for use in determining ground contact and absence of ground contact. Additionally, various rotorcraft methods process signals from various combinations of the landing gear sensors to provide or improve various rotorcraft functions.

BACKGROUND

Erroneous rotorcraft ground moding can be a catastrophic safety hazard that leads to mitigations that add weight, cost and complexity. The hazard severity of erroneous ground moding is aircraft configuration-dependent. Erroneous rotorcraft air moding on the ground can lead to catastrophic aeromechanic instability as the landing gear provide additional resistance to attitude changes. Thus, it is common rotorcraft practice to reduce flight control attitude feedback gains upon ground contact. It is also common rotorcraft practice to disable outer loops and automatic trim integrators upon ground contact. For example, it is common practice to disable the position hold mode upon ground contact to avoid potential for damaging rotor flapping or rolling over as the rotors build-up sideward forces and rolling moments attempting to null a small position error against opposition from landing gear side-forces.

Erroneous ground moding in the air inhibits rotorcraft flight modes, causing poor or unsafe handling qualities that may contribute to a mishap. Unexpected stick response from using ground gains while airborne can cause dangerous pilot-induced-oscillations (PIO) leading to a mishap. Especially in blowing dust or snow, the position hold mode helps pilots maintain horizontal position. Failure of the position hold to engage after takeoff in a degraded visual environment due to an erroneous ground contact sensor can lead to inadvertent collisions with other nearby aircraft, buildings, trees or terrain.

Accordingly, those skilled in the art continue with research and development efforts to improve techniques for reliably detecting landing gear ground contact and absence of ground contact in a rotorcraft.

SUMMARY

Disclosed are examples of landing gear assemblies, rotorcraft and rotorcraft methods. The following is a non-exhaustive list of examples, which may or may not be claimed, of the subject matter according to the present disclosure.

In an example, the disclosed landing gear assembly for a rotorcraft includes a shock absorber, a ground support assembly and an airframe linkage assembly. The shock absorber includes a force sensor to detect a pressure of an incompressible fluid within the shock absorber and a temperature sensor to detect a temperature of the incompressible fluid. The ground support assembly pivotally linked to the shock absorber and includes an axle and a ground contact element rotationally or pivotally movable in relation to the axle. The airframe linkage assembly pivotally linked to at least one of the shock absorber and the ground support assembly and includes a position sensor to detect movement of the axle between compressed and uncompressed conditions of the shock absorber.

In an example, the disclosed rotorcraft includes a first landing gear assembly, a second landing gear assembly and an attitude control system. The first landing gear assembly supports a first portion of the rotorcraft while the first landing gear assembly is in contact with a landing surface. The first landing gear assembly including a first force sensor to detect a pressure of an incompressible fluid within a first shock absorber of the first landing gear assembly, a first temperature sensor to detect a temperature of the incompressible fluid within the first shock absorber and a first position sensor to detect movement of a first axle in a first ground support assembly of the first landing gear assembly between a compressed condition and an uncompressed condition of the first shock absorber. The second landing gear assembly supports at least a second portion of the rotorcraft while the second landing gear assembly is in contact with the landing surface. The second landing gear assembly including a second force sensor to detect a pressure of an incompressible fluid within a second shock absorber of the second landing gear assembly, a second temperature sensor to detect a temperature of the incompressible fluid within the second shock absorber and a second position sensor to detect movement of a second axle in a second ground support assembly of the second landing gear assembly between a compressed condition and an uncompressed condition of the second shock absorber. The attitude control system controls flight dynamics of the rotorcraft based at least in part on a first force signal received from the first force sensor, a first temperature signal received from the first temperature sensor, a first position signal relating to a position of the first axle received from the first position sensor, a second force signal received from the second force sensor, a second temperature signal received from the second temperature sensor and a second position signal relating to a position of the second axle received from the second position sensor.

In an example, the disclosed rotorcraft method includes: (1) receiving a force signal from a force sensor of a shock absorber in a landing gear assembly of a rotorcraft in response to the force sensor detecting a pressure of an incompressible fluid within the shock absorber; (2) receiving a temperature signal from a temperature sensor of the shock absorber in response to the temperature sensor detecting a temperature of the incompressible fluid; and (3) processing the force signal and the temperature signal to determine a force measurement indicative of a static compression force within the shock absorber.

Other examples of the disclosed landing gear assemblies, rotorcraft and rotorcraft methods will become apparent from the following detailed description, the accompanying drawings and the appended claims.

BRIEF DESCRIPTION OF THE DRAWINGS

FIG. 11 is a flow diagram of an example of a rotorcraft method;

FIG. 16, in combination with FIG. 11, is a flow diagram of another example of a rotorcraft method;

FIG. 18, in combination with FIGS. 11 and 17, is a flow diagram of still another example of a rotorcraft method;

FIG. 26, in combination with FIGS. 11 and 24, is a flow diagram of another example of a rotorcraft method;

FIG. 27, in combination with FIGS. 11, 24 and 26, is a flow diagram of yet another example of a rotorcraft method;

FIG. 28, in combination with FIGS. 11, 24 and 26, is a flow diagram of still another example of a rotorcraft method;

DETAILED DESCRIPTION

Figure 1:
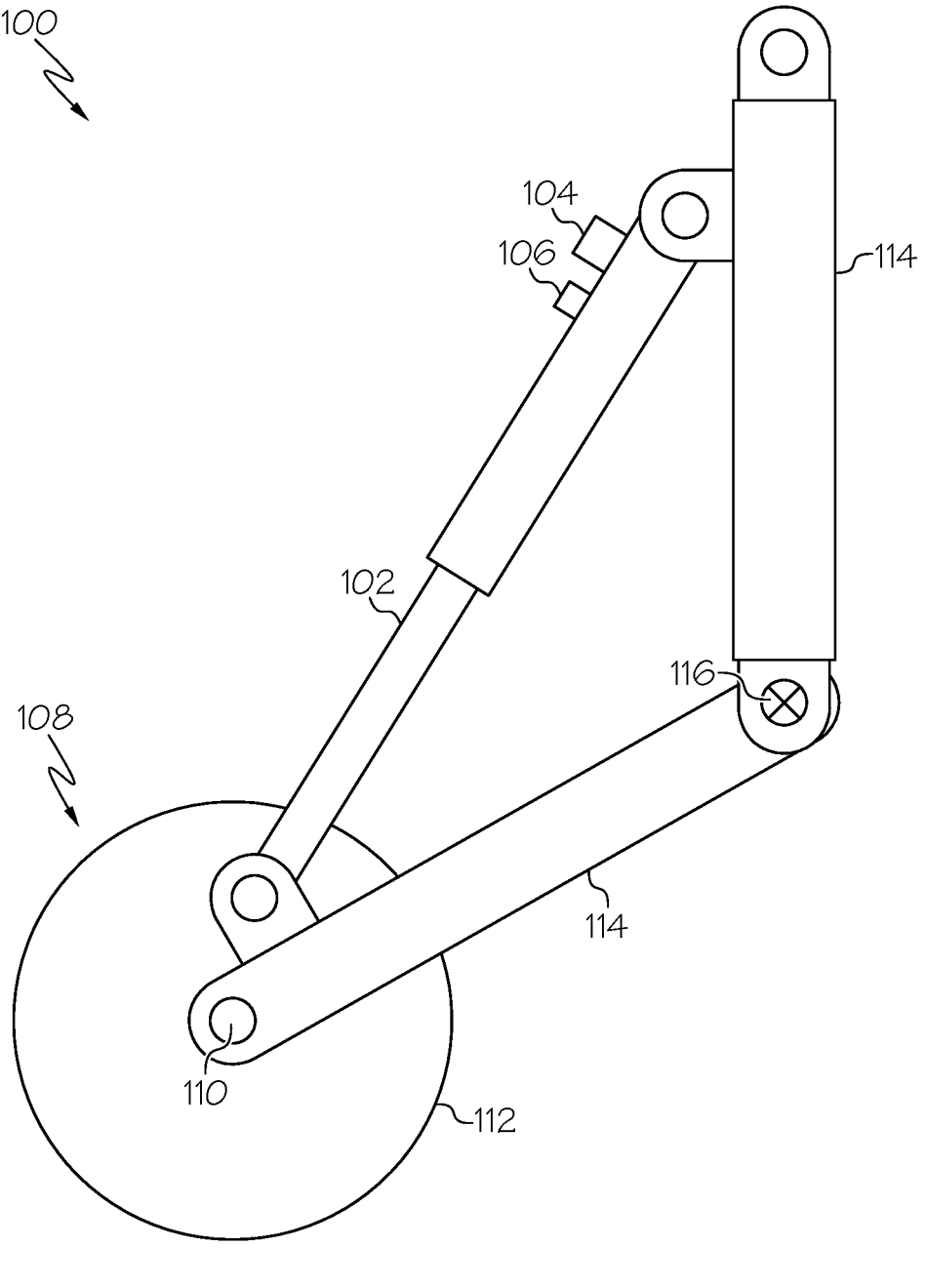
FIG. 1 is a side elevation view of an example of a landing gear assembly for a rotorcraft.

The various examples of landing gear assemblies, rotorcraft and rotorcraft methods provide techniques provide sensors on landing gear assemblies of rotorcraft that provide signals for processing by an attitude control system for control of various rotorcraft functions. For example, detection of ground contact by one or more landing gear assemblies with a landing surface and the absence of ground contact by one or more landing gear assemblies can be determined by processing the sensor signals to determine whether to switch the rotorcraft from air moding to ground moding during a landing sequence and from ground moding to air moding during a takeoff sequence. Similarly, the sensor signals can be processed during takeoff and landing sequences for consideration in controlling flight dynamics for the rotorcraft. Additionally, the sensor signals can be processed to determine health of the landing gear assemblies and to determine a center of gravity location for the rotorcraft.

Various processing examples disclosed herein replace conventional dynamic flight control based on discrete ground contact switches that produce binary signals with improved dynamic flight control using analog sensors that detect a range of conditions and produce high resolution analog or digital signals. The analog sensors are embedded in the landing gear to provide landing gear axle position and shock absorber force. Using of the sensors and the signal processing techniques disclosed herein provide reliable ground contact sensing, health monitoring of sensors and shock absorbers, improved handling qualities, automatic load balancing of the landing gear using primary flight controls, and rotorcraft weight and balance measurements when the rotors are stopped.

The landing gear assemblies, rotorcraft and rotorcraft methods disclosed herein solve multiple problems, including unreliable ground moding, detecting hazardous shock absorber fault conditions, hazardously difficult handling qualities for unachievable takeoffs and landings in high winds and sloping terrain, and damaging structural loads due to force fights between rotors and landing gear. For example, rotorcraft with modern hingeless rotors are much more sensitive to wind on the ground than traditional articulated rotors having modest flap hinge offset. With soft landing gear, the direct moments from hingeless rotors in winds can cause unacceptably large attitude changes, so rotor control inputs are warranted. Excessive rotor control inputs can cause structural damage to the rotor when constrained by the ground, especially during slope operations. By measuring landing gear forces using landing gear assemblies, rotorcraft and rotorcraft methods disclosed herein, attitude hold augmentation can remain active to reduce pilot workload while limiting rotor control inputs to prevent rotor damage.

Improper nitrogen precharge pressure in shock absorbers of landing gear assemblies due to improper servicing or seal failure alters the spring rate and preload. This can lead to unusual attitudes on the ground or catastrophic aeromechanic instability. The landing gear assemblies, rotorcraft and rotorcraft methods disclosed herein detect faults in the shock absorber to warn maintainers and aircrews.

The landing gear assemblies, rotorcraft and rotorcraft methods disclosed herein also improve landing gear reliability and maintainability, which are challenges for rotorcraft. The data from the landing gear sensors are recorded to provide a history of landing load and permit monitoring of changes over time. With this data, a maintainer can easily determine whether design limits were exceeded in case of hard landings/impacts and what unplanned maintenance is required. The data can also be used to determine when the shock absorber needs to be serviced or if there is damage. Prognostic algorithms may be used to replace the shock absorber prior to failure.

With a simple binary ground contact switch, it is impossible to discern between an airborne state (open switch) and a broken wire or sensor. For example, with a variable differential transformer (VDT) sensor, it is possible to immediately detect electrical faults in the sensor and wiring whether airborne or groundborne using inline monitors. The landing gear assemblies, rotorcraft and rotorcraft methods disclosed herein also enables weighing the rotorcraft while supported by the landing gear. The landing gear assemblies, rotorcraft and rotorcraft methods disclosed herein create the potential for alleviating crash loads that drive weight by feeding back landing gear loads to the main rotor collective to cushion hard landings.

Presently fielded rotorcraft employ either mechanical contact switches or inductive proximity switches to detect ground contact upon initial displacement of the shock absorber position. Low actuation forces avoid erroneous air moding on the ground. The low actuation forces are achieved using either a soft, short-stroke spring mechanism in the landing gear load path, called a 'lost motion mechanism,' or a mechanical rebound spring in the oleo pneumatic shock absorber to alleviate the gas spring preload at full shock absorber extension. Adding a lost motion mechanism wastes stroke with no attenuation of landing loads, adds weight and is vulnerable to foreign object debris (FOD) and potential jamming. Adding a rebound spring in the shock absorber can introduce problems achieving full shock absorber extension when spring and friction forces vary over time and temperature. When paired with a discrete binary ground contact sensor, failure to reach full shock absorber extension causes erroneous ground moding while airborne. With only a binary zero (0) or one (1) state from the sensor, the flight control software is unable to discern whether airborne or groundborne. With an analog sensor, the absence of velocity or position change when near full extend is indicative of an airborne state, so the system is better able to reliably discern ground contact. For example, certain rotorcraft may use oleo pneumatic shock absorbers, elastomeric rebound springs to reduce preload and inductive proximity switches to detect ground contact. Crewmembers of such rotorcraft may kick down the landing gear to achieve airborne mode when the shock absorber pressure is insufficient to overcome friction and elastomeric rebound spring forces. Implementing the landing gear assemblies, rotorcraft and rotorcraft methods disclosed herein would eliminate this issue.

Some existing examples of ground contact sensing utilize a load pin in the landing gear load path (often connected to the shock absorber). The pin is hollow and instrumented with strain gauges. The drawbacks of this configuration is that strain gauges are often deemed unreliable in a production environment and the pin is highly dependent on manufacturing. In some cases, such as a cantilevered landing gear, multiple load sensors would be needed. In another example, a rotorcraft may feature a hingeless rotor and may use a mast moment sensor and display for the pilot to monitor during landings and takeoffs. A drawback of this approach is the need for the pilot to look inside at this gauge during the critical landing phase, rotorcraft design constraints on load paths for placing such a sensor and inaccuracy when multiple load paths are present between the rotor and the landing gear. This system may be single redundant, and failure may restrict ability to complete a mission. In yet another example, a rotorcraft may feature an advanced flex beam type of hingeless rotor, and may be susceptible to listing (rolling motion) in crosswinds on soft landing gear. With attitude hold disabled on the ground (like most rotorcraft), the pilot had to apply control stick inputs to level the rotorcraft. This is sometimes viewed as requiring more work to fly the rotorcraft on the ground than to fly it in the air.

The landing gear assemblies, rotorcraft and rotorcraft methods disclosed herein use embedded position and force sensors in the landing gear assemblies. Temperature sensors may also be used in conjunction with the force sensors. For example, force-vs-position characteristics of oleo pneumatic shock struts are typically flat near full extend (low spring constant). The force sensors are affected by both landing gear position (spring) and velocity (damper). Therefore, landing gear position is the preferred flight critical primary sensor for detecting ground contact. A force sensor can be used to measure force-vs-position characteristics of the shock strut to detect erroneous servicing of the precharge pressure, total seal failure and rotorcraft weight and balance data. A shock strut temperature sensor can be used to adjust force-vs-position characteristics based on temperature.

After detecting landing gear compression (velocity or position) that constrains pitch, roll or yaw motion, the attitude control system activates appropriate ground moding logic. For example, nose and main landing gear contact constrain pitch but not roll, so the pitch axis uses ground mode while the roll axis uses air mode. After detecting landing gear near full extend and not moving, the attitude control system activates appropriate ground moding logic. When sloping terrain or crosswinds cause misalignment between the rotorcraft attitude and plane of the landing zone, the landing gear do not compress symmetrically. This asymmetric compression introduces pitching and rolling moments on the rotorcraft that are opposed by the rotor, leading to both steady and vibratory structural loads. As landing gear are compressed, the advanced control laws of the rotorcraft methods disclosed herein automatically command pitch and roll rates to alleviate structural loads when appropriate. During a slope landing, the uphill gear will contact the ground first. Upon further descent, the uphill gear will provide a significant rolling moment down the hill that is opposed by the rotors. As rotor thrust is reduced further, the rotorcraft methods disclosed herein automatically commands a downhill roll rate to alleviate the force fight between the rotor and landing gear.

The landing gear assemblies, rotorcraft and rotorcraft methods disclosed herein replace simple binary open/closed switches with analog sensors measuring the landing gear compression, force and temperature. Signals from the analog sensors are used to monitor faults, reliably identify ground contact and automatically alleviate loads. For example, the landing gear compression sensors may include linear variable differential transformers (LVDTs), rotary variable differential transformers (RVDTs) or potentiometers. The landing gear force sensors could directly measure force in the load path using a strain gauge type of device or measure fluid pressure using a strain gauge on a diaphragm or a piston-spring mechanism with an LVDT.

Figure 2:
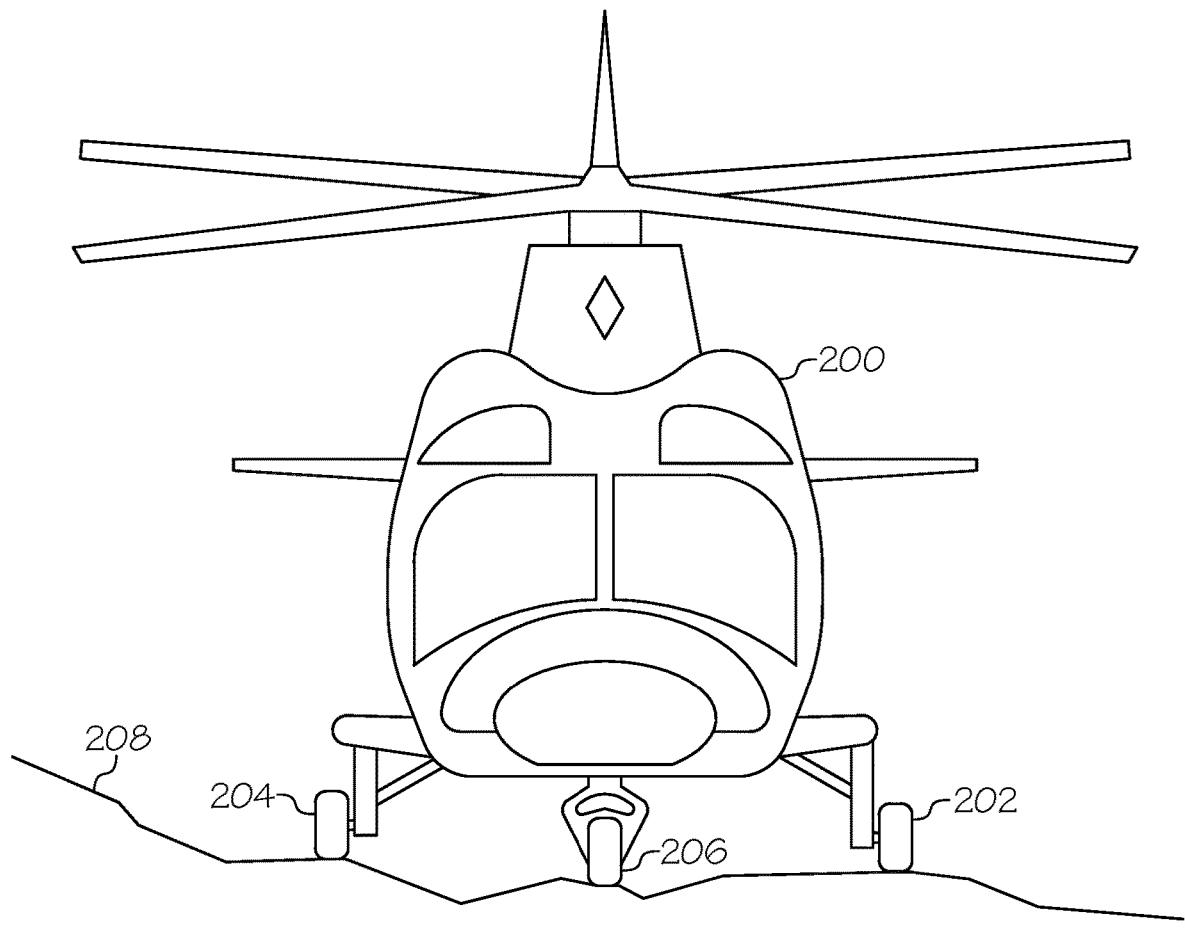
FIG. 2 is a front elevation view of an example of a rotorcraft on an uneven landing surface that includes the landing gear assemblies of FIG. 1.
Figure 3:
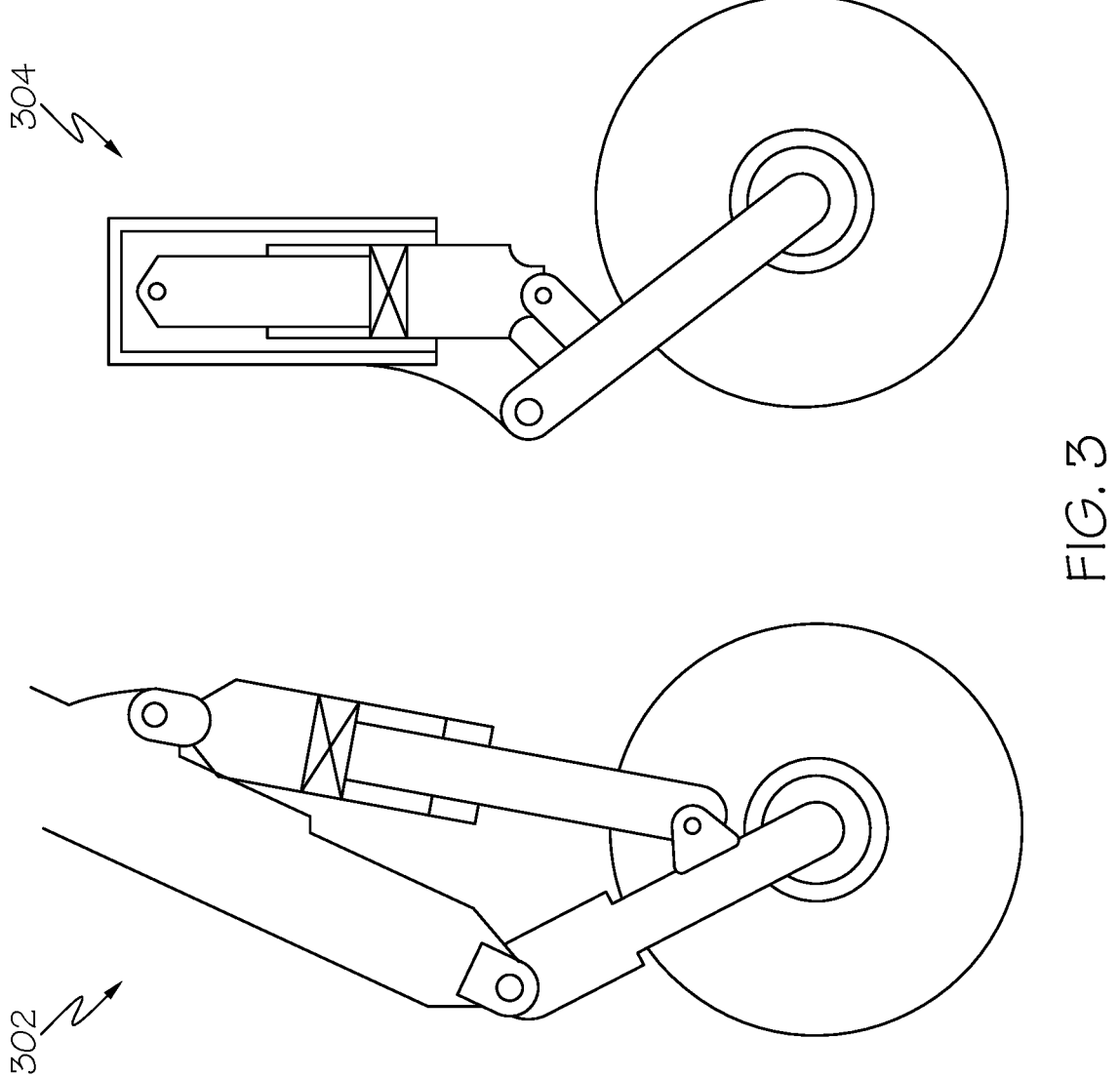
FIG. 3 provides side elevation views of two examples of landing gear assemblies with an articulated landing gear geometry.
Figure 4B:
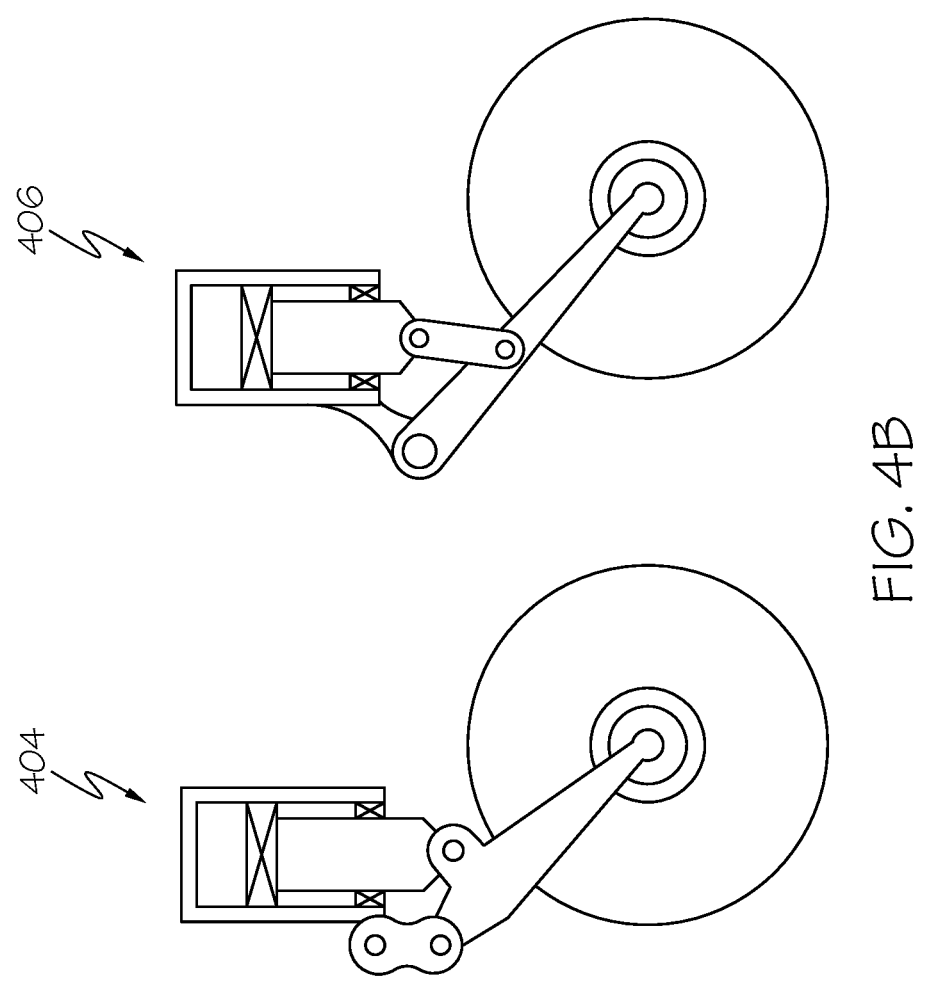
FIG. 4B provides side elevation views of two examples of landing gear assemblies with a semi-articulated landing gear geometry.
Figure 4A:
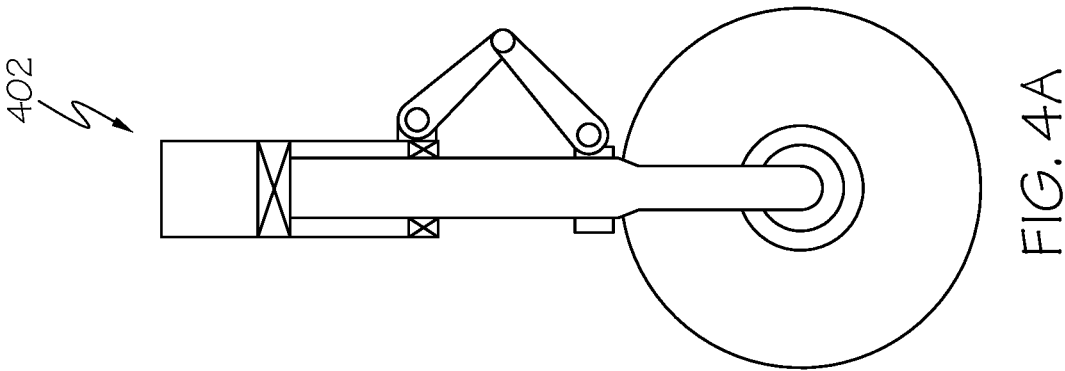
FIG. 4A provides a side elevation view of an example of a landing gear assembly with a telescoping landing gear geometry.
Figure 5:
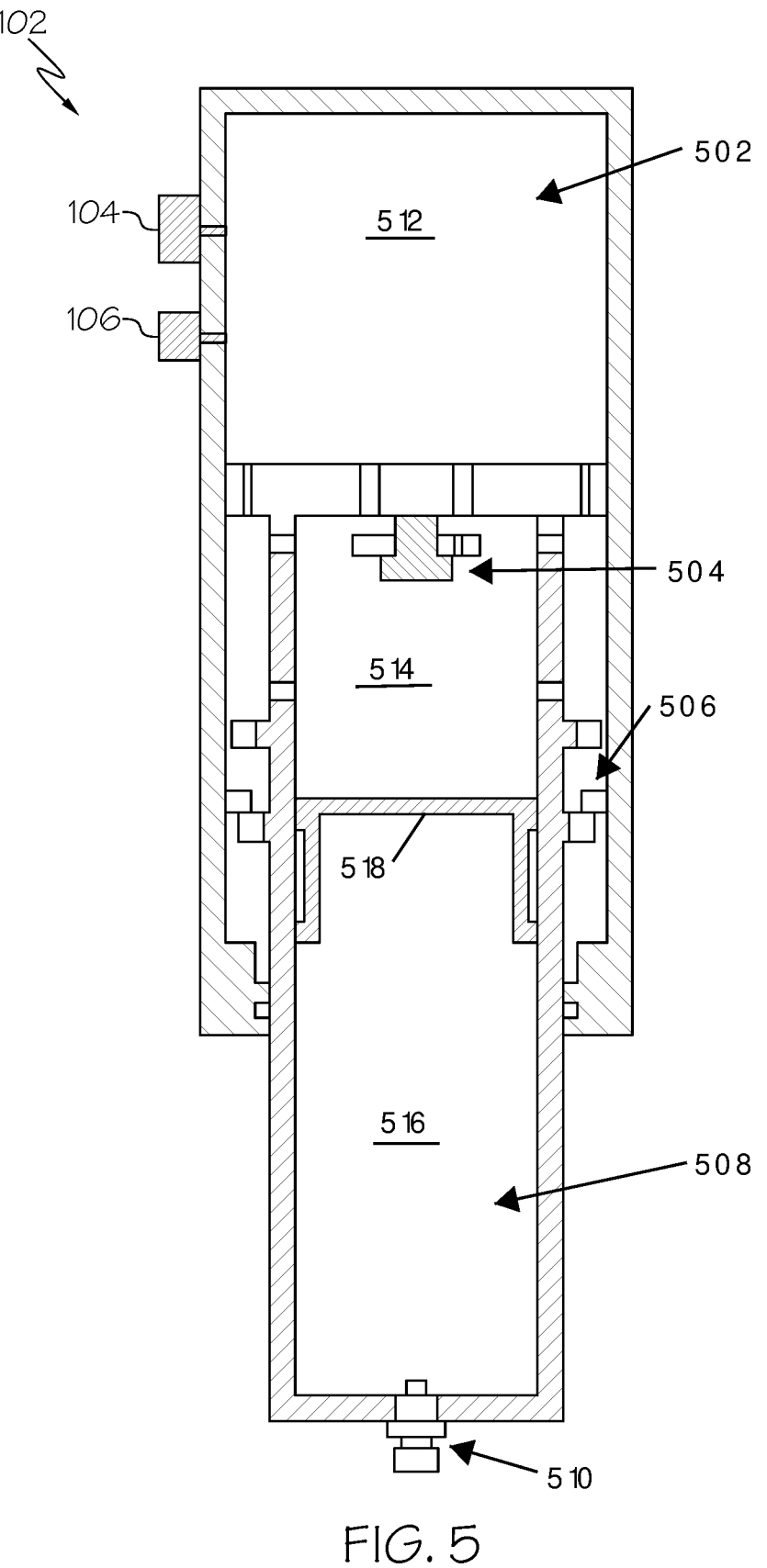
FIG. 5 is a cross-sectional view of an example of a shock absorber for the landing gear assembly of FIG. 1.
Figure 6:
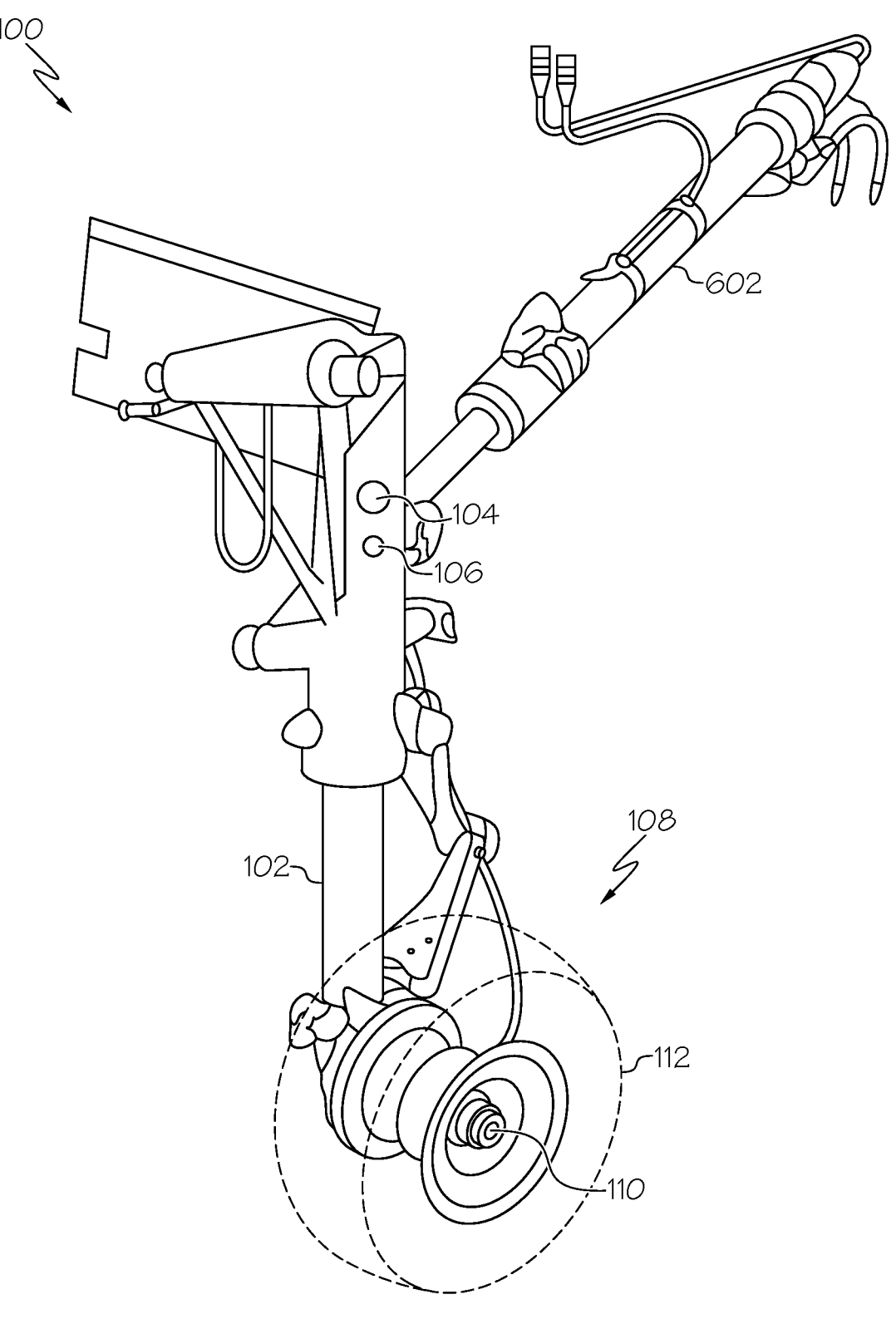
FIG. 6 is a perspective view of another example of a landing gear assembly for a rotorcraft.
Figure 7:
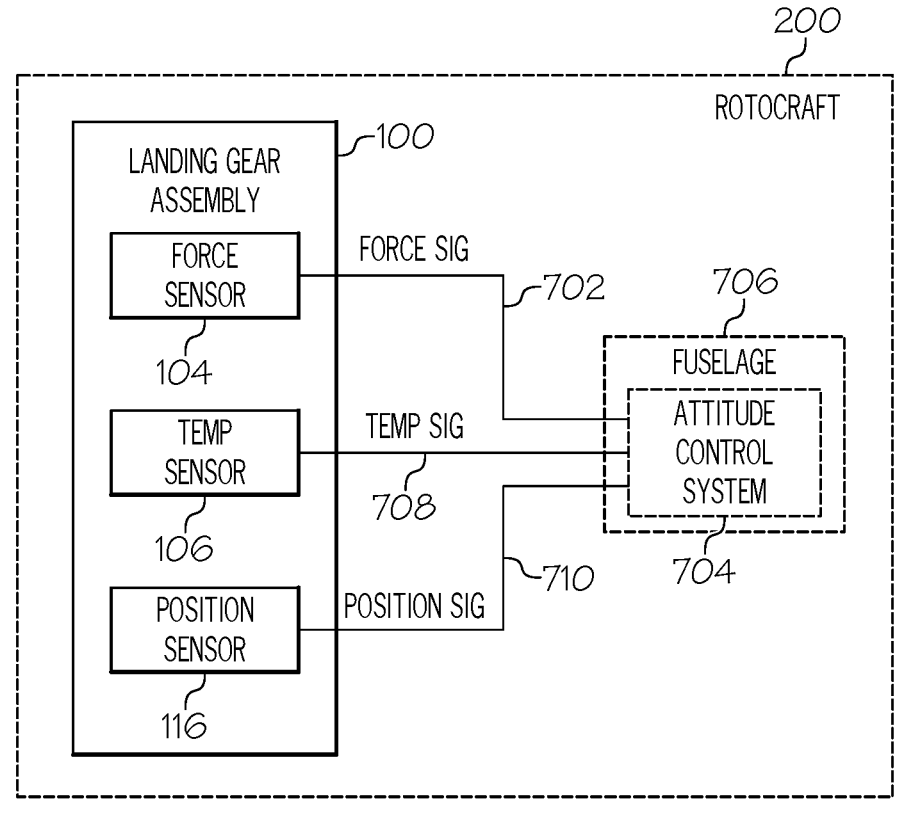
FIG. 7 is a functional block diagram of the landing gear assembly of FIG. 1 for the rotorcraft of FIG. 2.
Figure 8:
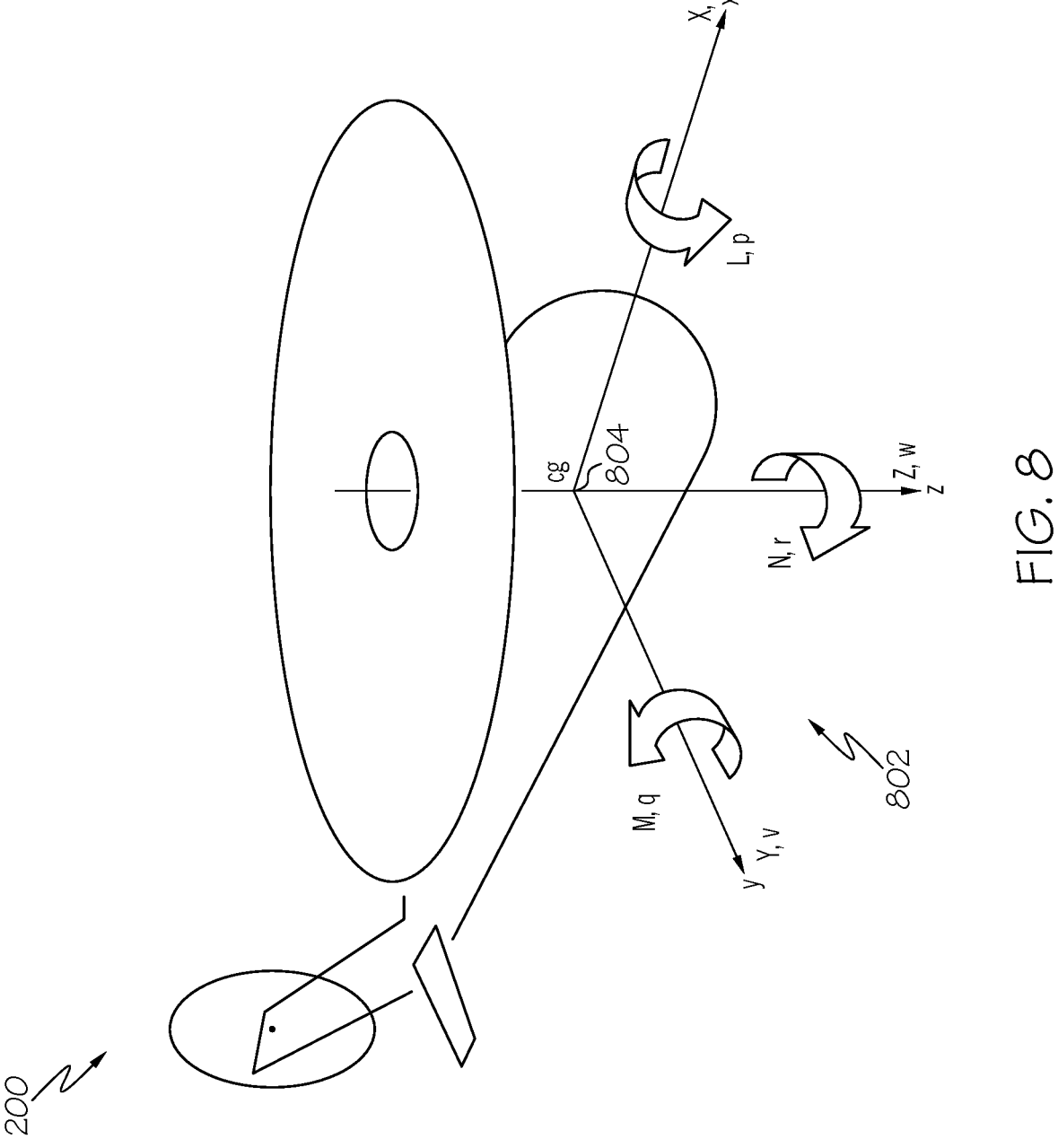
FIG. 8 is a perspective view of another example of a rotorcraft that shows flight dynamics and an example of a center of gravity location for the rotorcraft.
Figure 9:
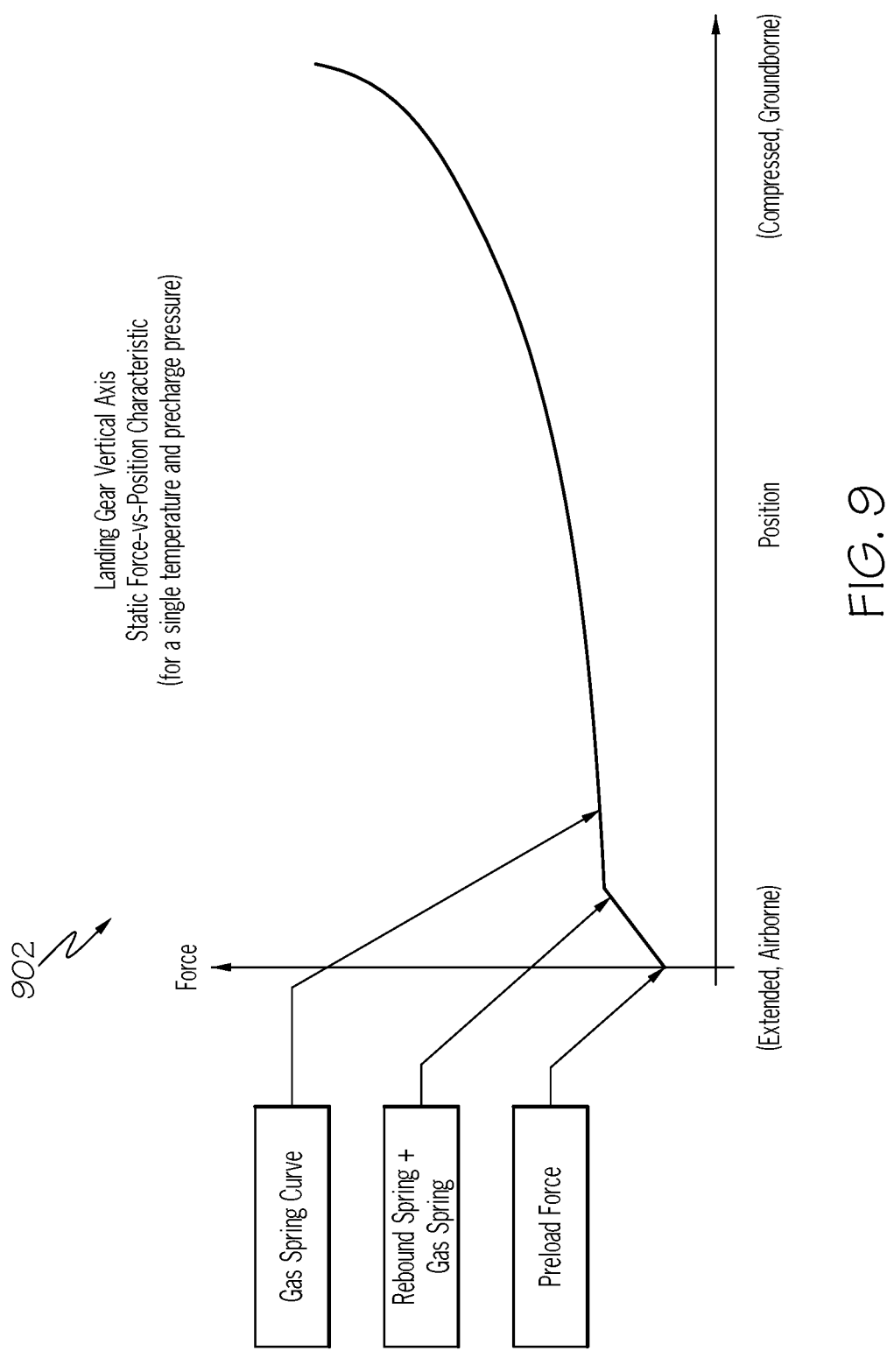
FIG. 9 provides a graph of an example of a predetermined force versus position characteristic for the landing gear assembly of FIG. 1 in relation to a predetermined temperature.
Figure 10:
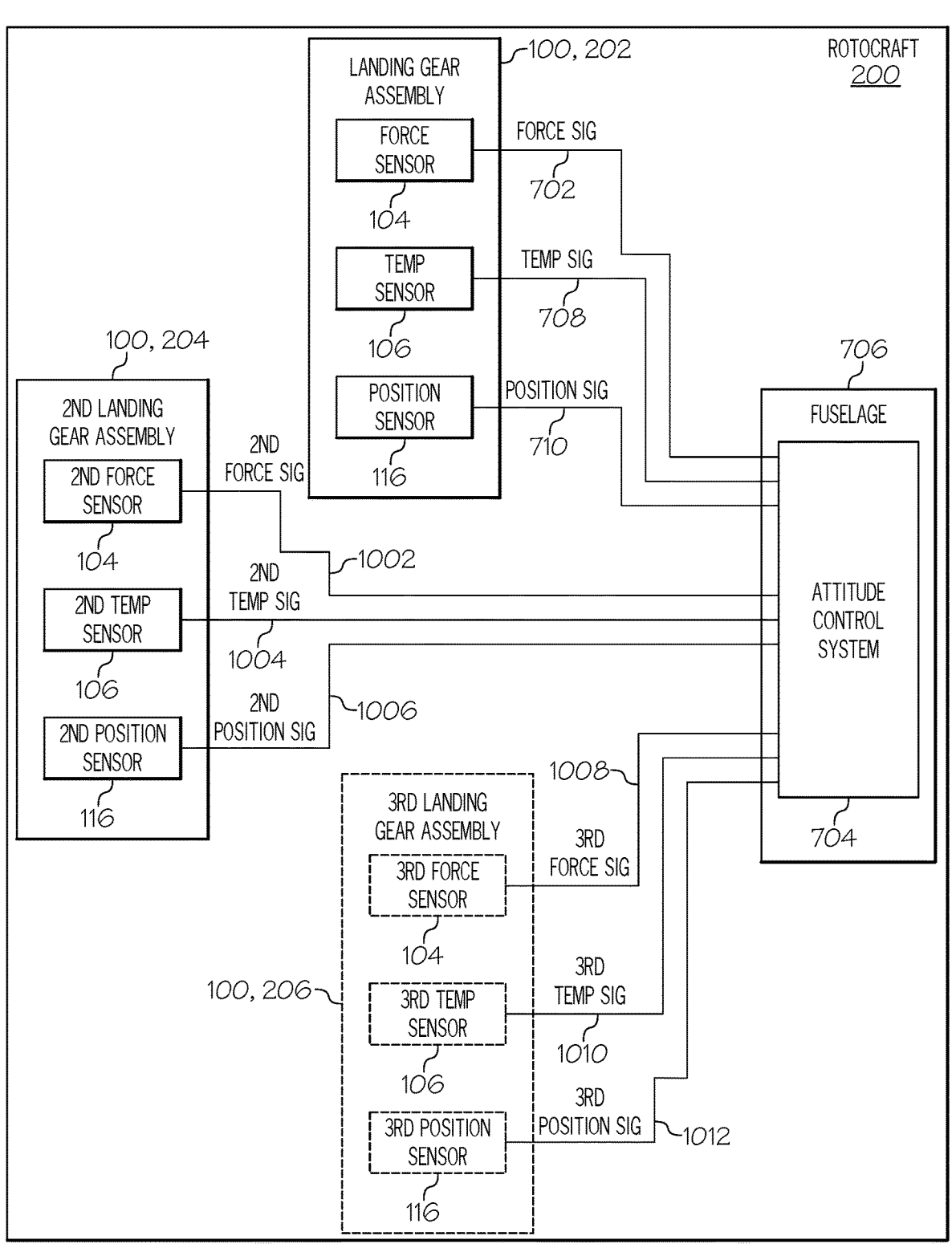
FIG. 10 is a functional block diagram showing of the rotorcraft of FIG. 2 with examples of the landing gear assembly of FIG. 1.

Referring generally to FIGS. 1-3, 4A-B and 5-10, by way of examples, the present disclosure is directed to a landing gear assembly 100 for a rotorcraft 200. FIG. 1 provides a side view elevation of an example of the landing gear assembly 100. FIG. 2 provides a front elevation view of an example of the rotorcraft 200. FIG. 3 provides side elevation views of landing gear assemblies with an articulated landing gear geometry. FIGS. 4A and 4B provides side elevation views of landing gear assemblies with telescoping and semi-articulated landing gear geometries. FIG. 5 provides a cross-sectional view of an example of a shock absorber 102 for the landing gear assembly 100 of FIG. 1. FIG. 6 provides a perspective view of another example of the landing gear assembly 100. FIG. 7 is a functional block diagram of the landing gear assembly 100 of FIG. 1 for the rotorcraft 200 of FIG. 2. FIG. 8 provides a perspective view of another example of the rotorcraft 200 that shows flight dynamics 802 and an example of a center of gravity location 804 for the rotorcraft 200. FIG. 9 shows a graph of an example of a predetermined force versus position characteristic 902 for the landing gear assembly of FIG. 1 in relation to a predetermined temperature. FIG. 10 is a functional block diagram of the rotorcraft 200 of FIG. 2 with examples of the landing gear assembly 100 of FIG. 1.

With reference again to FIGS. 1-3, 4A-B and 5-10, in one or more examples, a landing gear assembly 100 for a rotorcraft 200 includes a shock absorber 102, a ground support assembly 108 and an airframe linkage assembly 114. The shock absorber 102 includes a force sensor 104 to detect a pressure of an incompressible fluid within the shock absorber 102 and a temperature sensor 106 to detect a temperature of the incompressible fluid. The ground support assembly 108 pivotally linked to the shock absorber 102 and including an axle 110 and a ground contact element 112 rotationally or pivotally movable in relation to the axle 110. The airframe linkage assembly 114 pivotally linked to at least one of the shock absorber 102 and the ground support assembly 108 and including a position sensor 116 to detect movement of the axle 110 between compressed and uncompressed conditions of the shock absorber 102.

In another example of the landing gear assembly 100, the airframe linkage assembly 114 defines a geometry for the landing gear assembly 100. The geometry includes a telescoping landing gear geometry 402, an articulated landing gear geometry 302, 304, a semi-articulated landing gear geometry 404, 406 or any other suitable landing gear geometry. In yet another example of the landing gear assembly 100, the rotorcraft 200 includes a helicopter, a vertical takeoff and landing rotorcraft, a tiltrotor aircraft, a rotorcraft drone, a rotorcraft unmanned air vehicle, a remotely-piloted unmanned air vehicle, an autonomous unmanned air vehicle, a helicopter drone, a quadcopter drone, a multirotor drone or any other suitable rotorcraft. In still another example of the landing gear assembly 100, the shock absorber 102 further includes an oleo pneumatic shock absorber, a single stage oleo pneumatic shock absorber, a double stage oleo pneumatic shock absorber or any other suitable shock absorber. In still yet another example of the landing gear assembly 100, the force sensor 104 includes a pressure sensor, a force transducer, a load cell, a capacitive load cell, a strain gauge load cell, a hydraulic load cell or any other suitable force sensor.

In another example of the landing gear assembly 100, the incompressible fluid includes a hydraulic fluid, a hydraulic oil or any other suitable incompressible fluid. In yet another example of the landing gear assembly 100, the temperature sensor 106 includes a thermocouple, a thermistor, a resistance temperature detector or any other suitable temperature sensor. In still another example of the landing gear assembly 100, the ground contact element 112 includes a wheel, a ski or any other suitable ground contact element. In still yet another example of the landing gear assembly 100, the airframe linkage assembly 114 further including a retract actuator 602 with an extend position and a retract position. The landing gear assembly 100 is extended as the retract actuator 602 reaches the extend position and the landing gear assembly 100 is retracted as the retract actuator 602 reaches the retract position.

In another example of the landing gear assembly 100, the position sensor 116 includes a linear position sensor, a rotary position sensor, an angular position sensor or any other suitable position sensor. In yet another example of the landing gear assembly 100, the compressed condition of the shock absorber 102 indicates the ground support assembly 108 is in contact with a landing surface 208 after preload forces on the shock absorber 102 are overcome. In still another example of the landing gear assembly 100, the uncompressed condition of the shock absorber 102 indicates the ground support assembly 108 is not in contact with a landing surface 208 until preload forces on the shock absorber 102 are overcome.

In still yet another example of the landing gear assembly 100, the force sensor 104 is configured to provide a force signal 702 indicative of the pressure of the incompressible fluid within the shock absorber 102 to an attitude control system 704 in a fuselage 706 of the rotorcraft 200. In a further example, the temperature sensor 106 is configured to provide a temperature signal 708 indicative of the temperature of the incompressible fluid within the shock absorber 102 to the attitude control system 704 of the rotorcraft 200. In an even further example, the attitude control system 704 is configured to process the force signal 702 and the temperature signal 708 to determine a force measurement indicative of a static compression force within the shock absorber 102. In an even yet further example, the attitude control system 704 is configured to process the force measurement to determine a vertical force measurement indicative of a static vertical force on the ground support assembly 108. In another even yet further example, the attitude control system 704 is configured to determine whether the ground contact element 112 of the ground support assembly 108 is in contact with a landing surface 208 or not in contact with the landing surface 208 based at least in part on the force measurement. In yet another even yet further example, the attitude control system 704 is configured to control flight dynamics 802 of the rotorcraft 200 in conjunction with a takeoff sequence or a landing sequence by the rotorcraft 200 based at least in part on the force measurement.

In still another even yet further example of the landing gear assembly 100, the position sensor 116 is configured to provide a position signal 710 to the attitude control system 704 of the rotorcraft 200 relating to a position of the axle 110. In a further example, the attitude control system 704 is configured to process the position signal 710 in relation to a predetermined reference point on the rotorcraft 200 to determine a position measurement indicative of the position of the axle 110 in relation to positions between the compressed and the uncompressed conditions of the shock absorber 102. In an even further example, the attitude control system 704 is configured to process the force measurement and the position measurement to determine whether the ground contact element 112 of the ground support assembly 108 is in contact with a landing surface 208 or not in contact with the landing surface 208. In another even further example, the attitude control system 704 is configured to control flight dynamics 802 of the rotorcraft 200 in conjunction with a takeoff sequence or a landing sequence by the rotorcraft 200 based at least in part on the force measurement and the position measurement.

In yet another even further example, the attitude control system 704 is configured to determine a series of force measurements and a corresponding series of position measurements during a takeoff sequence or a landing sequence by the rotorcraft 200, configured to compare the series of force measurements and the series of position measurements to a predetermined force versus position characteristic 902 for the landing gear assembly 100 and configured to determine a health condition of the landing gear assembly 100. In a further example, the health condition of the landing gear assembly 100 includes an acceptable condition, a degraded condition, an out of tolerance condition or any other suitable health condition.

In another example of the landing gear assembly 100, the position sensor 116 is configured to provide a position signal 710 to an attitude control system 704 in a fuselage 706 of the rotorcraft 200 relating to a position of the axle 110. In a further example, the attitude control system 704 is configured to process the position signal 710 in relation to a predetermined reference point on the rotorcraft 200 to determine a position measurement indicative of the position of the axle 110 in relation to positions between the compressed and the uncompressed conditions of the shock absorber 102. In an even further example, the attitude control system 704 is configured to process the position measurement to determine whether the ground contact element 112 of the ground support assembly 108 is in contact with a landing surface 208 or not in contact with the landing surface 208. In another even further example, the attitude control system 704 is configured to control flight dynamics 802 of the rotorcraft 200 in conjunction with a takeoff sequence or a landing sequence by the rotorcraft 200 based at least in part on the position measurement.

With reference again to FIG. 5, the shock absorber 102 includes the force sensor 104 and the temperature sensor 106. The shock absorber 102 also includes an incompressible fluid 502 (e.g., oil) in an upper chamber 512 and a lower chamber 514, a pressure operated valve 504 for variable damping and a check valve 506 for asymmetric rebound damping. Additionally, the shock absorber 102 includes a compressible fluid 508 (e.g., nitrogen) in a third chamber 516 below a floating piston 518 dividing the oil 502 in the lower chamber 514 and the nitrogen 508 in the third chamber 516 to prevent nitrogen bubbles from reducing damping.

Referring generally to FIGS. 1-3, 4A-B and 5-10, by way of examples, the present disclosure is directed to a rotorcraft 200. FIG. 1 provides a side view elevation of an example of a landing gear assembly 100. FIG. 2 provides a front elevation view of an example of the rotorcraft 200. FIG. 3 provides side elevation views of landing gear assemblies with an articulated landing gear geometry. FIGS. 4A and 4B provides side elevation views of landing gear assemblies with telescoping and semi-articulated landing gear geometries. FIG. 5 provides a cross-sectional view of an example of a shock absorber 102 for the landing gear assembly 100 of FIG. 1. FIG. 6 provides a perspective view of another example of the landing gear assembly 100. FIG. 7 is a functional block diagram of the landing gear assembly 100 of FIG. 1 for the rotorcraft 200 of FIG. 2. FIG. 8 provides a perspective view of another example of the rotorcraft 200 that shows flight dynamics 802 and an example of a center of gravity location 804 for the rotorcraft 200. FIG. 9 shows a graph of an example of a predetermined force versus position characteristic 902 for the landing gear assembly of FIG. 1 in relation to a predetermined temperature. FIG. 10 is a functional block diagram of the rotorcraft 200 of FIG. 2 with examples of the landing gear assembly 100 of FIG. 1.

With reference again to FIGS. 1-3, 4A-B and 5-10, in one or more examples, a rotorcraft 200 includes a first landing gear assembly 100, 202, a second landing gear assembly 100, 204 and an attitude control system 704. The first landing gear assembly 100, 202 supports a first portion of the rotorcraft 200 while the first landing gear assembly 100, 202 is in contact with a landing surface 208. The first landing gear assembly 100, 202 including a first force sensor 104 to detect a pressure of an incompressible fluid within a first shock absorber 102 of the first landing gear assembly 100, 202, a first temperature sensor 106 to detect a temperature of the incompressible fluid within the first shock absorber 102 and a first position sensor 116 to detect movement of a first axle 110 in a first ground support assembly 108 of the first landing gear assembly 100, 202 between a compressed condition and an uncompressed condition of the first shock absorber 102. The second landing gear assembly 100, 204 supports at least a second portion of the rotorcraft 200 while the second landing gear assembly 100, 204 is in contact with the landing surface 208. The second landing gear assembly 100, 204 including a second force sensor 104 to detect a pressure of an incompressible fluid within a second shock absorber 102 of the second landing gear assembly 100, 204, a second temperature sensor 106 to detect a temperature of the incompressible fluid within the second shock absorber 102 and a second position sensor 116 to detect movement of a second axle 110 in a second ground support assembly 108 of the second landing gear assembly 100, 204 between a compressed condition and an uncompressed condition of the second shock absorber 102. The attitude control system 704 controls flight dynamics 802 of the rotorcraft 200 based at least in part on a first force signal 702 received from the first force sensor 104, a first temperature signal 708 received from the first temperature sensor 106, a first position signal 710 relating to a position of the first axle 110 received from the first position sensor 116, a second force signal 1002 received from the second force sensor 104, a second temperature signal 1004 received from the second temperature sensor 106 and a second position signal 1006 relating to a position of the second axle 110 received from the second position sensor 116.

In another example of the rotorcraft 200, the attitude control system 704 processes the first force signal 702 and the first temperature signal 708 to determine a first force measurement indicative of a first static compression force within the first shock absorber 102 of the first landing gear assembly 100, 202. The attitude control system 704 uses the first force measurement to determine whether a first ground contact element 112 in the first ground support assembly 108 of the first landing gear assembly 100, 202 is in contact with the landing surface 208 or not in contact with the landing surface 208. The attitude control system 704 processes the second force signal 1002 and the second temperature signal 1004 to determine a second force measurement indicative of a second static compression force within the second shock absorber 102 of the second landing gear assembly 100, 204. The attitude control system 704 uses the second force measurement to determine whether a second ground contact element 112 in the second ground support assembly 108 of the second landing gear assembly 100, 204 is in contact with the landing surface 208 or not in contact with the landing surface 208.

In a further example, the attitude control system 704 processes the first force measurement to determine a first vertical force measurement indicative of a first static vertical force on the first ground support assembly 108. The attitude control system 704 processes the second force measurement to determine a second vertical force measurement indicative of a second static vertical force on the second ground support assembly 108.

In another further example, during a landing sequence for the rotorcraft 200 that begins with the first landing gear assembly 100, 202 and the second landing gear assembly 100, 204 not in contact with the landing surface 208, the attitude control system 704 determines the first landing gear assembly 100, 202 comes into contact with the landing surface 208 based at least in part on the first force measurement and controls flight dynamics 802 of the rotorcraft 200 based at least in part on the first force measurement and the second force measurement to bring the second landing gear assembly 100, 204 into contact with the landing surface 208 and to manage the first static compression force within the first shock absorber 102 to avoid or mitigate damage to the rotorcraft 200 due to the first static compression force during the landing sequence.

In yet another further example, during a takeoff sequence for the rotorcraft 200 that begins with the first landing gear assembly 100, 202 and the second landing gear assembly 100, 204 in contact with the landing surface 208, the attitude control system 704 determines the first landing gear assembly 100, 202 is no longer in contact with the landing surface 208 based at least in part on the first force measurement and controls flight dynamics 802 of the rotorcraft 200 based at least in part on the first force measurement and the second force measurement to bring the second landing gear assembly 100, 204 out of contact with the landing surface 208 and to manage the second static compression force within the second shock absorber 102 to avoid or mitigate damage to the rotorcraft 200 due to the second static compression force during the takeoff sequence.

In still yet another example, the attitude control system 704 processes the first position signal 710 in relation to a first predetermined reference point on the rotorcraft 200 to determine a first position measurement indicative of the position of the first axle 110 in relation to positions between the compressed and the uncompressed conditions of the first shock absorber 102. The attitude control system 704 uses the first force measurement and the first position measurement to determine whether the first ground contact element 112 is in contact with the landing surface 208 or not in contact with the landing surface 208. The attitude control system 704 processes the second position signal 1006 in relation to a second predetermined reference point on the rotorcraft 200 to determine a second position measurement indicative of the position of the second axle 110 in relation to positions between the compressed and the uncompressed conditions of the second shock absorber 102. The attitude control system 704 uses the second force measurement and the second position measurement to determine whether the second ground contact element 112 is in contact with the landing surface 208 or not in contact with the landing surface 208.

In an even further example, during a landing sequence for the rotorcraft 200 that begins with the first landing gear assembly 100, 202 and the second landing gear assembly 100, 204 not in contact with the landing surface 208, the attitude control system 704 determines the first landing gear assembly 100, 202 comes into contact with the landing surface 208 based at least in part on the first force measurement and the first position measurement and controls flight dynamics 802 of the rotorcraft 200 based at least in part on the first force measurement, the first position measurement, the second force measurement and the second position measurement to bring the second landing gear assembly 100, 204 into contact with the landing surface 208 and to manage the first static compression force within the first shock absorber 102 to avoid or mitigate damage to the rotorcraft 200 due to the first static compression force during the landing sequence.

In another even further example, during a takeoff sequence for the rotorcraft 200 that begins with the first landing gear assembly 100, 202 and the second landing gear assembly 100, 204 in contact with the landing surface 208, the attitude control system 704 determines the first landing gear assembly 100, 202 is no longer in contact with the landing surface 208 based at least in part on the first force measurement and the first position measurement and controls flight dynamics 802 of the rotorcraft 200 based at least in part on the first force measurement, the first position measurement, the second force measurement and the second position measurement to bring the second landing gear assembly 100, 204 out of contact with the landing surface 208 and to manage the second static compression force within the second shock absorber 102 to avoid or mitigate damage to the rotorcraft 200 due to the second static compression force during the takeoff sequence.

In still yet another further example, the attitude control system 704 processes the first position signal 710 in relation to a first predetermined reference point on the rotorcraft 200 to determine a first position measurement indicative of the position of the first axle 110 in relation to positions between the compressed and the uncompressed conditions of the first shock absorber 102. The attitude control system 704 uses the first position measurement to determine whether the first ground contact element 112 is in contact with the landing surface 208 or not in contact with the landing surface 208. The attitude control system 704 processes the second position signal 1006 in relation to a second predetermined reference point on the rotorcraft 200 to determine a second position measurement indicative of the position of the second axle 110 in relation to positions between the compressed and the uncompressed conditions of the second shock absorber 102. The attitude control system 704 uses the second position measurement to determine whether the second ground contact element 112 is in contact with the landing surface 208 or not in contact with the landing surface 208.

In an even further example, during a landing sequence for the rotorcraft 200 that begins with the first landing gear assembly 100, 202 and the second landing gear assembly 100, 204 not in contact with the landing surface 208, the attitude control system 704 determines the first landing gear assembly 100, 202 comes into contact with the landing surface 208 based at least in part on the first position measurement and controls flight dynamics 802 of the rotorcraft 200 based at least in part on the first position measurement and the second position measurement to bring the second landing gear assembly 100, 204 into contact with the landing surface 208 and to manage the first static compression force within the first shock absorber 102 to avoid or mitigate damage to the rotorcraft 200 due to the first static compression force during the landing sequence.

In another even further example, during a takeoff sequence for the rotorcraft (200) that begins with the first landing gear assembly (100, 202) and the second landing gear assembly (100, 204) in contact with the landing surface (208), the attitude control system (704) determines the first landing gear assembly (100, 202) is no longer in contact with the landing surface (208) based at least in part on the first position measurement and controls flight dynamics (802) of the rotorcraft (200) based at least in part on the first position measurement and the second position measurement to bring the second landing gear assembly (100, 204) out of contact with the landing surface (208) and to manage the second static compression force within the second shock absorber (102) to avoid or mitigate damage to the rotorcraft (200) due to the second static compression force during the takeoff sequence.

In yet another example, the rotorcraft 200 also includes a third landing gear assembly 100, 206 that supports at least a third portion of the rotorcraft 200 while the third landing gear assembly 100, 206 is in contact with the landing surface 208. The third landing gear assembly 100, 206 including a third force sensor 104 to detect a pressure of an incompressible fluid within a third shock absorber 102 of the third landing gear assembly 100, 206, a third temperature sensor 106 to detect a temperature of the incompressible fluid within the third shock absorber 102 and a third position sensor 116 to detect movement of a third axle 110 in a third ground support assembly 108 of the third landing gear assembly 100, 206 between a compressed condition and an uncompressed condition of the third shock absorber 102. The attitude control system 704 controls the flight dynamics 802 of the rotorcraft 200 based at least in part on a third force signal 1008 received from the third force sensor 104, a third temperature signal 1010 received from the third temperature sensor 106 and a third position signal 1012 relating to a position of the third axle 110 received from the third position sensor 116.

In a further example, the attitude control system 704 processes the first force signal 702 and the first temperature signal 708 to determine a first force measurement indicative of a first static compression force within the first shock absorber 102 of the first landing gear assembly 100, 202. The attitude control system 704 uses the first force measurement to determine whether a first ground contact element 112 in the first ground support assembly 108 of the first landing gear assembly 100, 202 is in contact with the landing surface 208 or not in contact with the landing surface 208. The attitude control system 704 processes the second force signal 1002 and the second temperature signal 1004 to determine a second force measurement indicative of a second static compression force within the second shock absorber 102 of the second landing gear assembly 100, 204. The attitude control system 704 uses the second force measurement to determine whether a second ground contact element 112 in the second ground support assembly 108 of the second landing gear assembly 100, 204 is in contact with the landing surface 208 or not in contact with the landing surface 208. The attitude control system 704 processes the third force signal 1008 and the third temperature signal 1010 to determine a third force measurement indicative of a third static compression force within the third shock absorber 102 of the third landing gear assembly 100, 206. The attitude control system 704 uses the third force measurement to determine whether a third ground contact element 112 in the third ground support assembly 108 of the third landing gear assembly 100, 206 is in contact with the landing surface 208 or not in contact with the landing surface 208.

In an even further example, the attitude control system 704 processes the first force measurement to determine a first vertical force measurement indicative of a first static vertical force on the first ground support assembly 108. The attitude control system 704 processes the second force measurement to determine a second vertical force measurement indicative of a second static vertical force on the second ground support assembly 108. The attitude control system 704 processes the third force measurement to determine a third vertical force measurement indicative of a third static vertical force on the third ground support assembly 108.

In another even further example, during ground operations for the rotorcraft 200 in which rotors are powered down, the attitude control system 704 determines the first landing gear assembly 100, 202 is in contact with the landing surface 208 based at least in part on the first force measurement, determines the second landing gear assembly 100, 204 is in contact with the landing surface 208 based at least in part on the second force measurement, determines the third landing gear assembly 100, 206 is in contact with the landing surface 208 based at least in part on the third force measurement and determines a current center of gravity location for the rotorcraft 200 based at least in part on the first force measurement, the second force measurement and the third force measurement.

In yet another even yet further example, the attitude control system 704 processes the first position signal 710 in relation to a first predetermined reference point on the rotorcraft 200 to determine a first position measurement indicative of the position of the first axle 110 in relation to positions between the compressed and the uncompressed conditions of the first shock absorber 102. The attitude control system 704 uses the first force measurement and the first position measurement to determine whether the first ground contact element 112 is in contact with the landing surface 208 or not in contact with the landing surface 208. The attitude control system 704 processes the second position signal 1006 in relation to a second predetermined reference point on the rotorcraft 200 to determine a second position measurement indicative of the position of the second axle 110 in relation to positions between the compressed and the uncompressed conditions of the second shock absorber 102. The attitude control system 704 uses the second force measurement and the second position measurement to determine whether the second ground contact element 112 is in contact with the landing surface 208 or not in contact with the landing surface 208. The attitude control system 704 processes the third position signal 1012 in relation to a third predetermined reference point on the rotorcraft 200 to determine a third position measurement indicative of the position of the third axle 110 in relation to positions between the compressed and the uncompressed conditions of the third shock absorber 102. The attitude control system 704 uses the third force measurement and the third position measurement to determine whether the third ground contact element 112 is in contact with the landing surface 208 or not in contact with the landing surface 208.

In an even yet further example, during ground operations for the rotorcraft 200 in which rotors are powered down, the attitude control system 704 determines the first landing gear assembly 100, 202 is in contact with the landing surface 208 based at least in part on the first force measurement and the first position measurement, determines the second landing gear assembly 100, 204 is in contact with the landing surface 208 based at least in part on the second force measurement and the second position measurement, determines the third landing gear assembly 100, 206 is in contact with the landing surface 208 based at least in part on the third force measurement and the third position measurement and determines a current center of gravity location for the rotorcraft 200 based at least in part on the first force measurement, the first position measurement, the second force measurement, the second position measurement, the third force measurement and the third position measurement.

In another further example, the attitude control system 704 processes the first position signal 710 in relation to a first predetermined reference point on the rotorcraft 200 to determine a first position measurement indicative of the position of the first axle 110 in relation to positions between the compressed and the uncompressed conditions of the first shock absorber 102. The attitude control system 704 uses the first position measurement to determine whether a first ground contact element 112 is in contact with the landing surface 208 or not in contact with the landing surface 208. The attitude control system 704 processes the second position signal 1006 in relation to a second predetermined reference point on the rotorcraft 200 to determine a second position measurement indicative of the position of the second axle 110 in relation to positions between the compressed and the uncompressed conditions of the second shock absorber 102. The attitude control system 704 uses the second position measurement to determine whether a second ground contact element 112 is in contact with the landing surface 208 or not in contact with the landing surface 208. The attitude control system 704 processes the third position signal 1012 in relation to a third predetermined reference point on the rotorcraft 200 to determine a third position measurement indicative of the position of the third axle 110 in relation to positions between the compressed and the uncompressed conditions of the third shock absorber 102. The attitude control system 704 uses the third position measurement to determine whether a third ground contact element 112 is in contact with the landing surface 208 or not in contact with the landing surface 208.

In an even further example, during ground operations for the rotorcraft 200 in which rotors are powered down, the attitude control system 704 determines the first landing gear assembly 100, 202 is in contact with the landing surface 208 based at least in part on the first position measurement, determines the second landing gear assembly 100, 204 is in contact with the landing surface 208 based at least in part on the second position measurement, determines the third landing gear assembly 100, 206 is in contact with the landing surface 208 based at least in part on the third position measurement and determines a current center of gravity location for the rotorcraft 200 based at least in part on the first position measurement, the second position measurement and the third position measurement.

Referring generally to FIGS. 1-3, 4A-B and 5-28, by way of examples, the present disclosure is directed to a rotorcraft method 1100, 1200, 1300, 1400, 1500, 1600, 1700, 1800, 1900, 2000, 2100, 2200, 2300, 2400, 2500, 2600, 2700, 2800. FIG. 1 provides a side view elevation of an example of the landing gear assembly 100. FIG. 2 provides a front elevation view of an example of the rotorcraft 200. FIG. 3 provides side elevation views of landing gear assemblies with an articulated landing gear geometry. FIGS. 4A and 4B provides side elevation views of landing gear assemblies with telescoping and semi-articulated landing gear geometries. FIG. 5 provides a cross-sectional view of an example of a shock absorber 102 for the landing gear assembly 100 of FIG. 1. FIG. 6 provides a perspective view of another example of the landing gear assembly 100. FIG. 7 is a functional block diagram of the landing gear assembly 100 of FIG. 1 for the rotorcraft 200 of FIG. 2. FIG. 8 provides a perspective view of another example of the rotorcraft 200 that shows flight dynamics 802 and an example of a center of gravity location 804 for the rotorcraft 200. FIG. 9 shows a graph of an example of a predetermined force versus position characteristic 902 for the landing gear assembly of FIG. 1 in relation to a predetermined temperature. FIG. 10 is a functional block diagram of the rotorcraft 200 of FIG. 2 with examples of the landing gear assembly 100 of FIG. 1.

Figure 12:
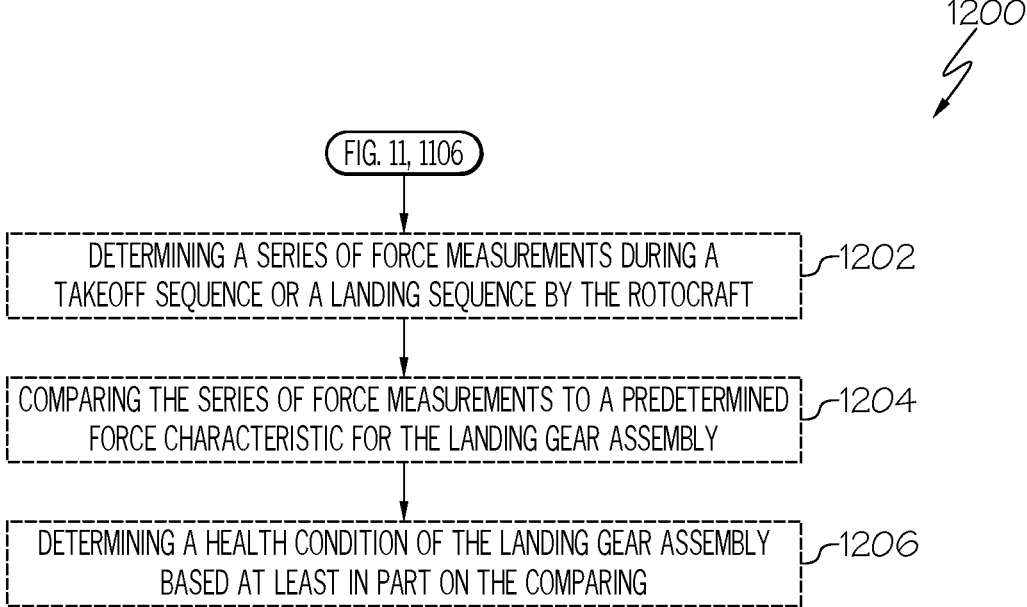
FIG. 12, in combination with FIG. 11, is a flow diagram of another example of a rotorcraft method.
Figure 13:
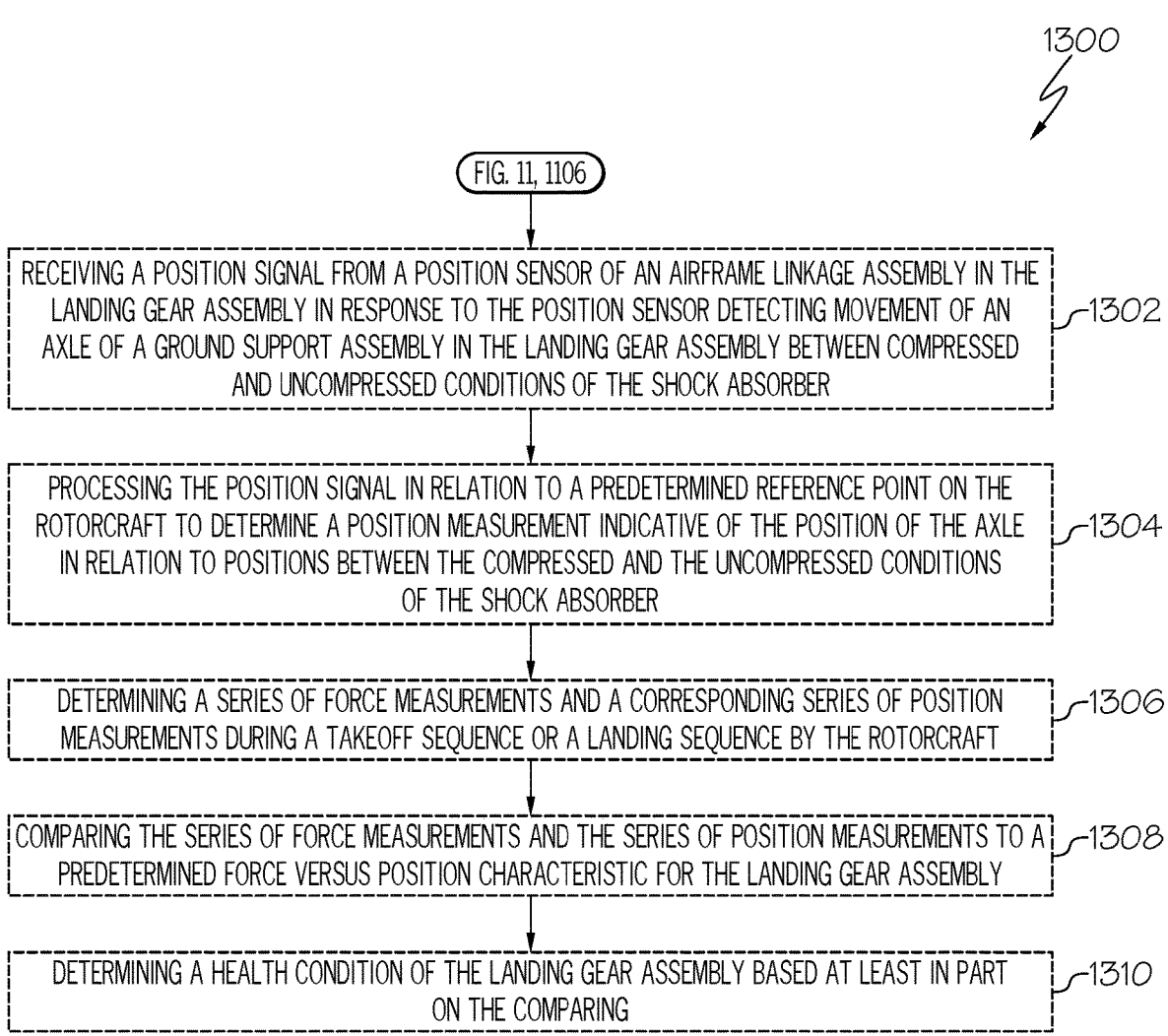
FIG. 13, in combination with FIG. 11, is a flow diagram of yet another example of a rotorcraft method.
Figure 14:
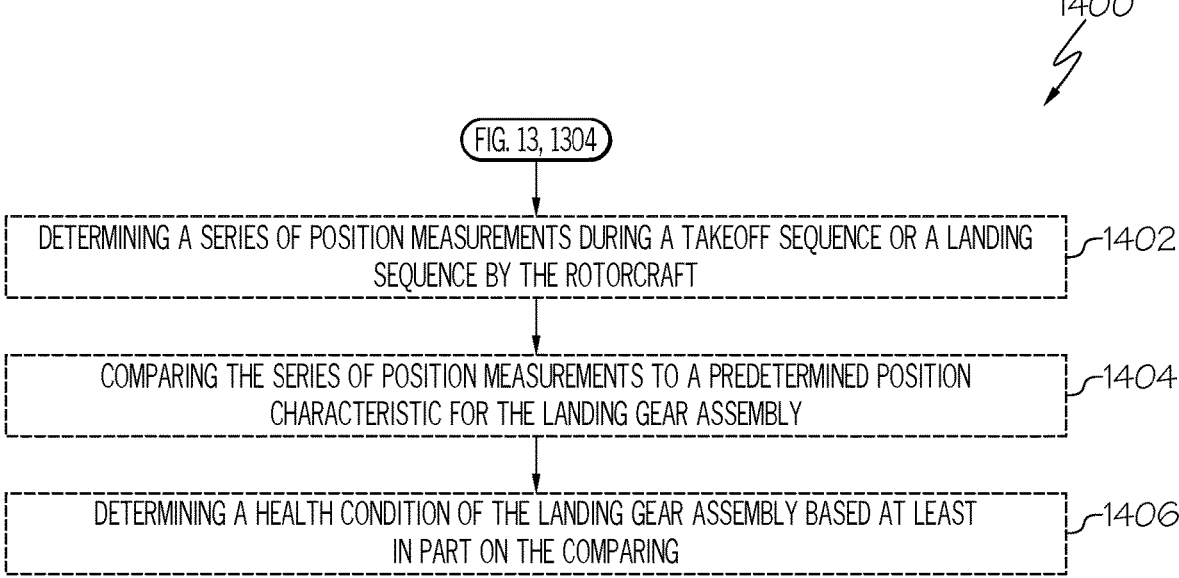
FIG. 14, in combination with FIGS. 11 and 13, is a flow diagram of still another example of a rotorcraft method.
Figure 15:
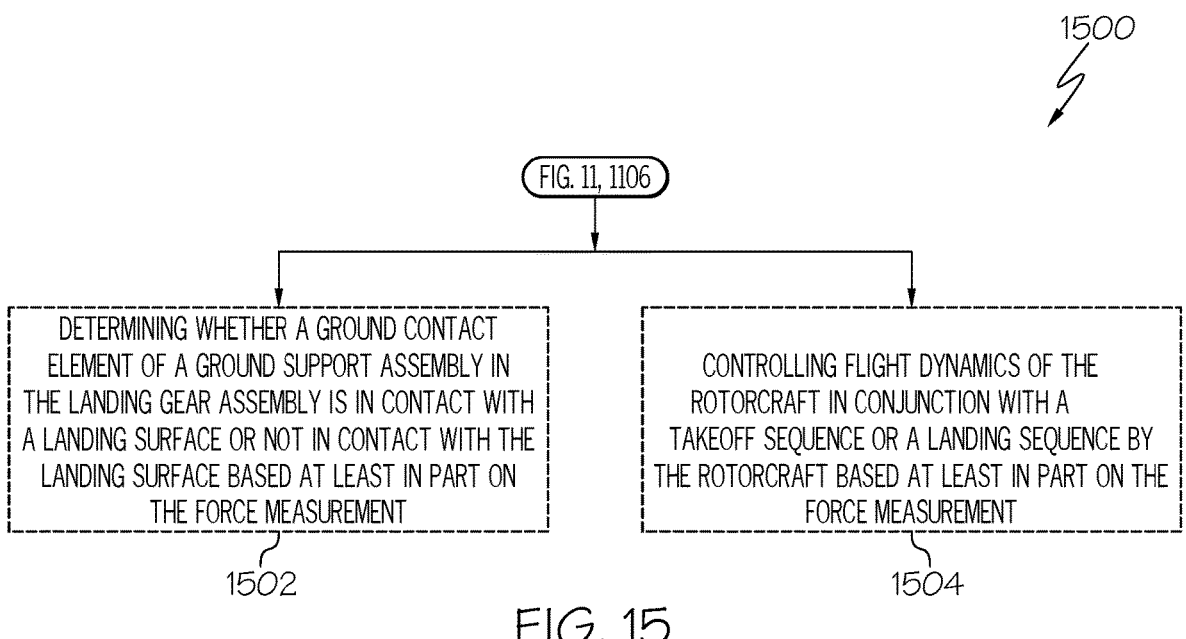
FIG. 15, in combination with FIG. 11, is a flow diagram of still yet another example of a rotorcraft method.
Figure 17:
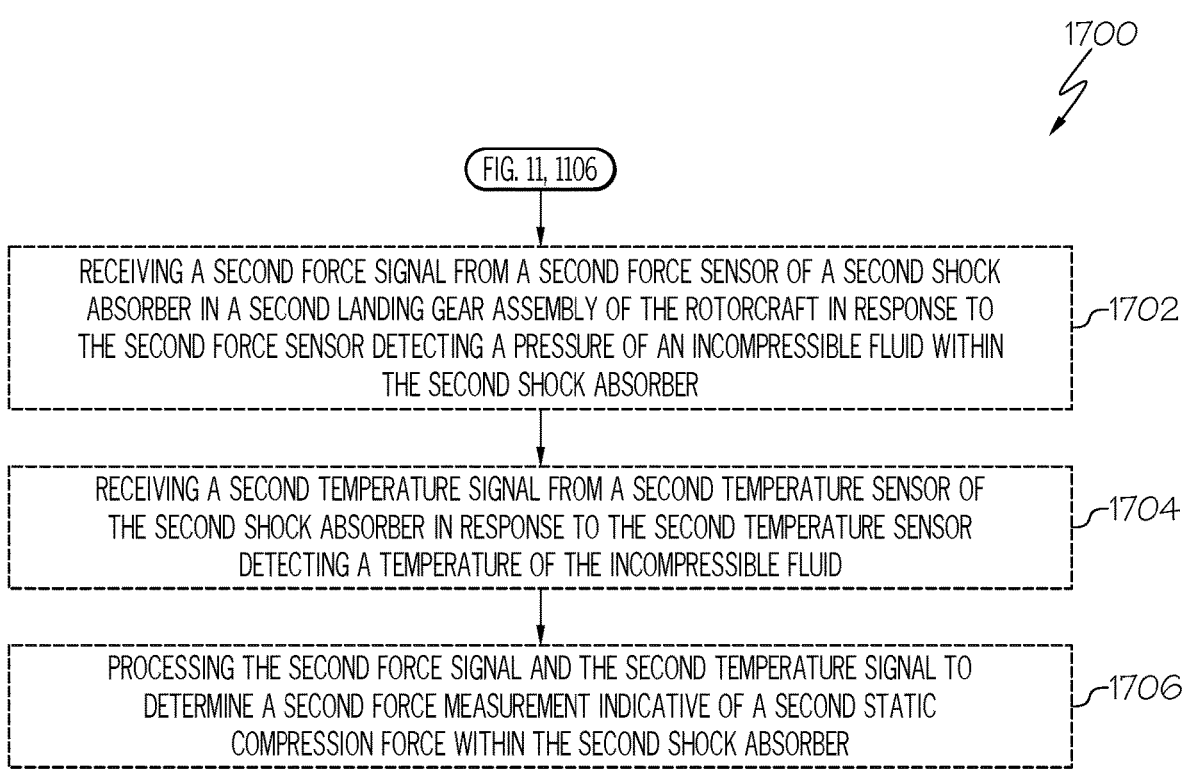
FIG. 17, in combination with FIG. 11, is a flow diagram of yet another example of a rotorcraft method.
Figure 19:
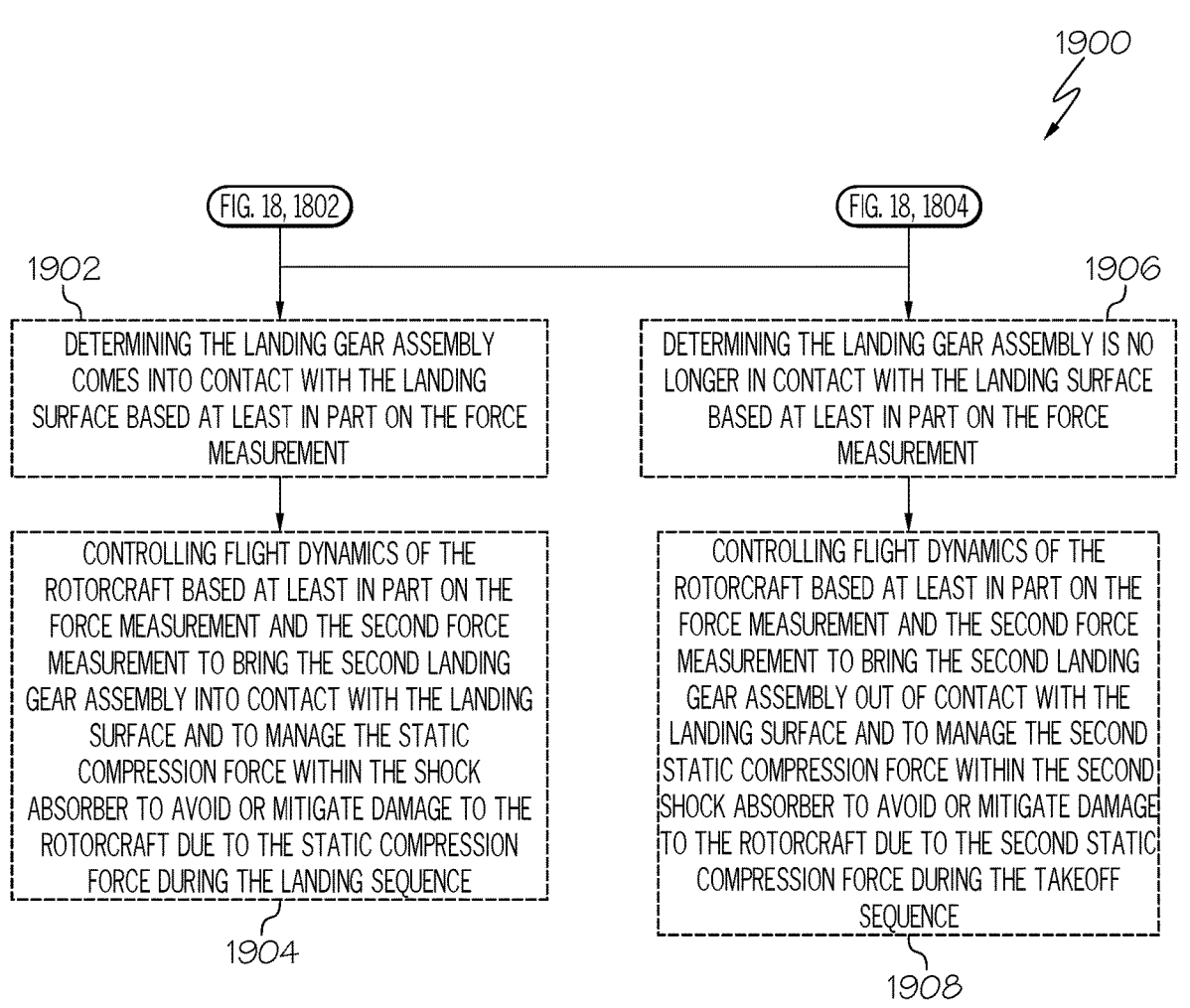
FIG. 19, in combination with FIGS. 11, 17 and 18, is a flow diagram of still yet another example of a rotorcraft method.
Figure 20:
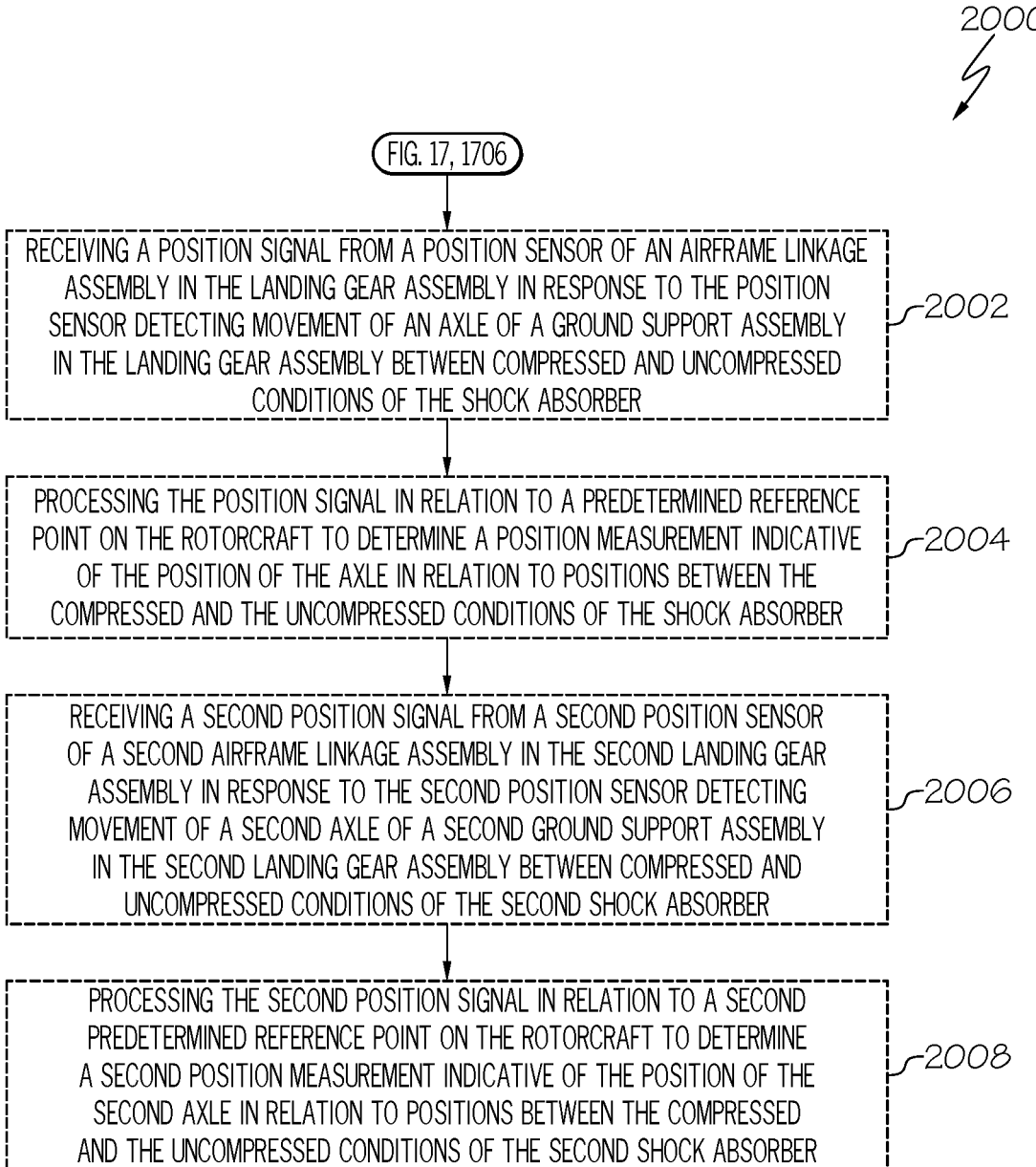
FIG. 20, in combination with FIGS. 11 and 17, is a flow diagram of still another example of a rotorcraft method.
Figure 21:
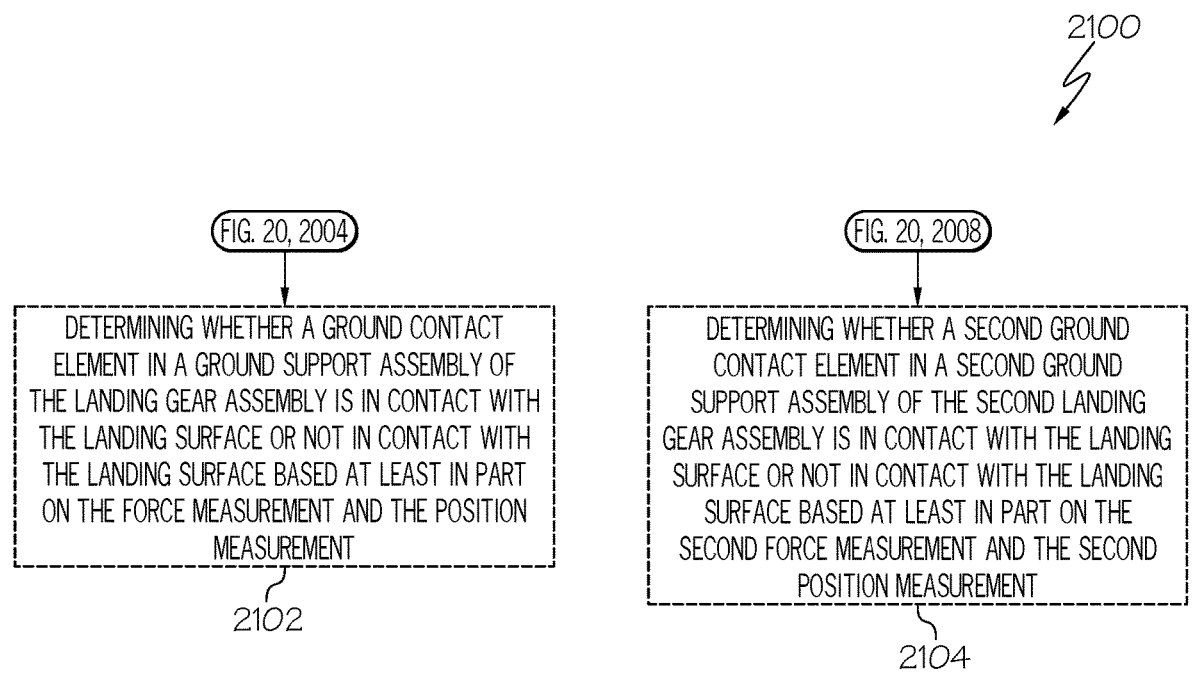
FIG. 21, in combination with FIGS. 11, 17 and 20, is a flow diagram of still yet another example of a rotorcraft method.
Figure 22:
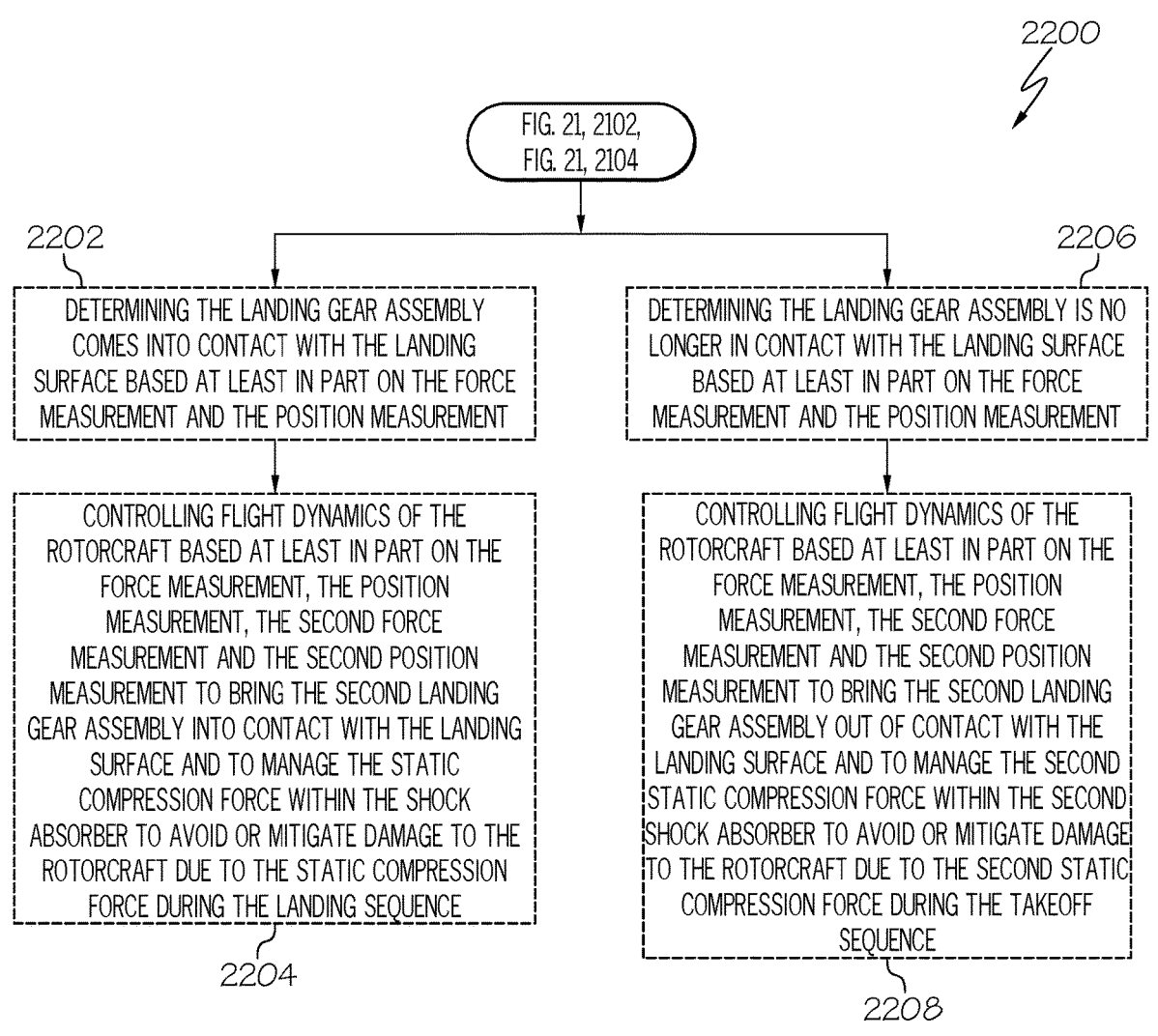
FIG. 22, in combination with FIGS. 11, 17, 20 and 21, is a flow diagram of another example of a rotorcraft method.
Figure 23:
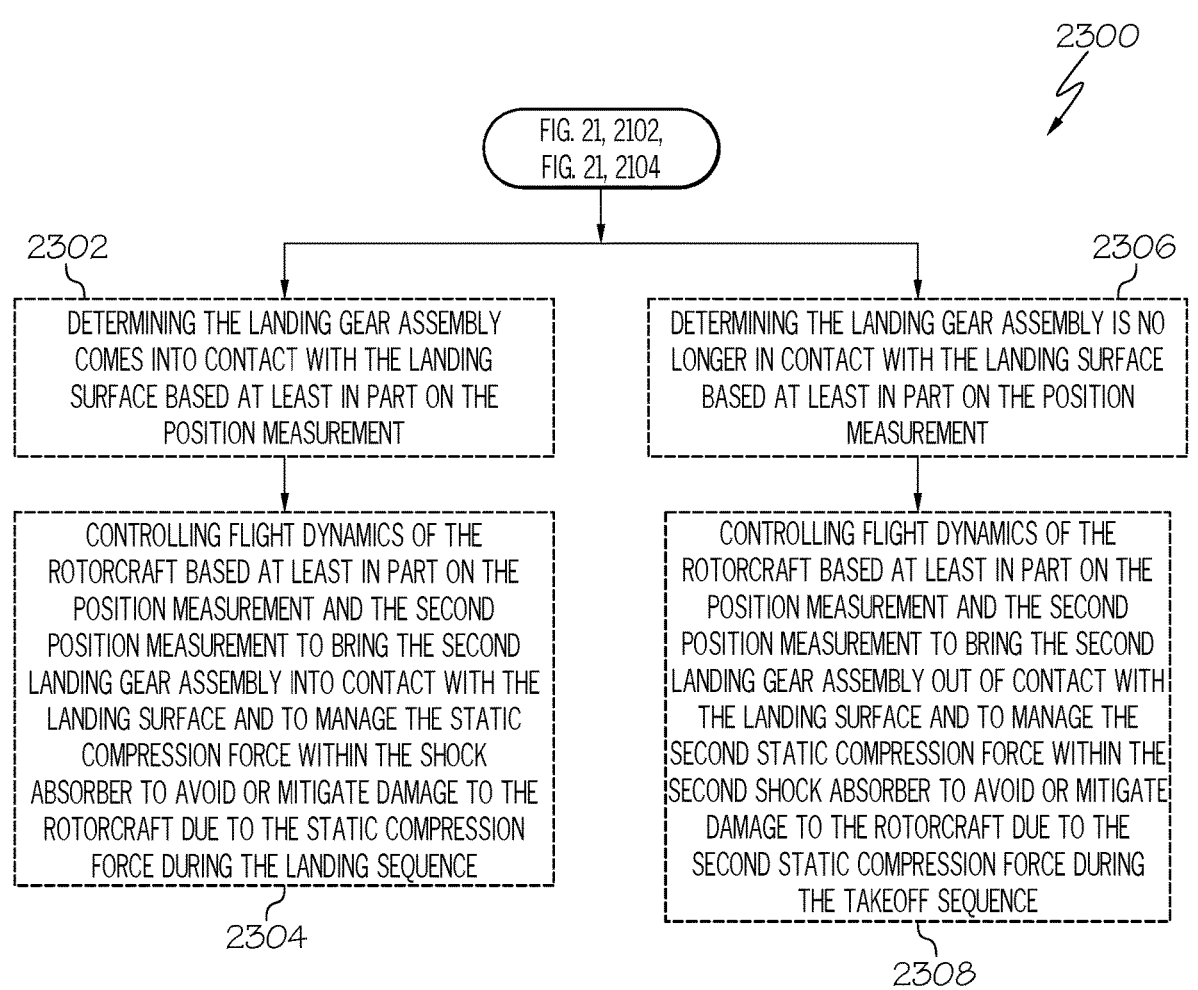
FIG. 23, in combination with FIGS. 11, 17, 20 and 21, is a flow diagram of yet another example of a rotorcraft method.
Figure 24:
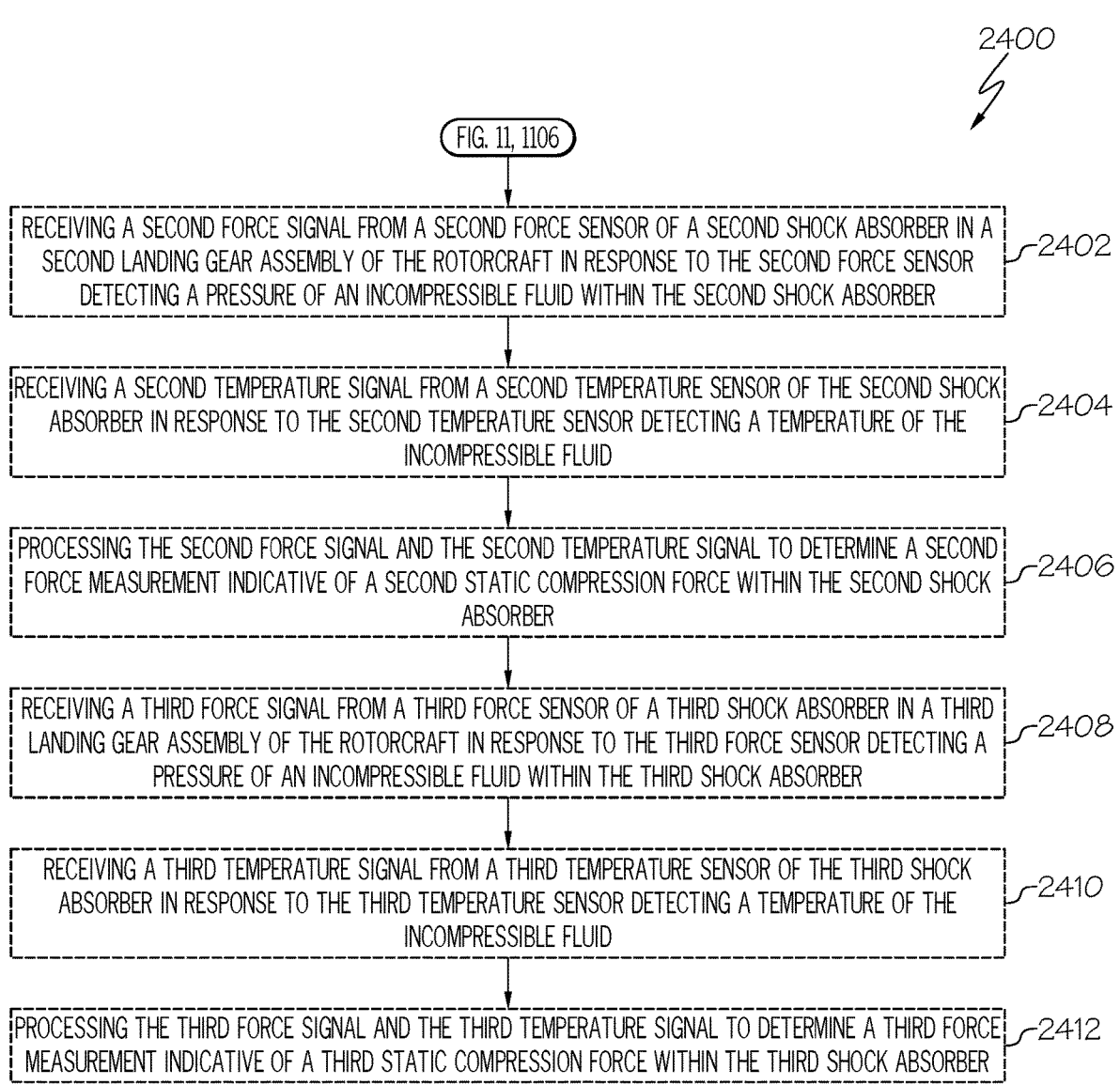
FIG. 24, in combination with FIG. 11, is a flow diagram of still another example of a rotorcraft method.
Figure 25:
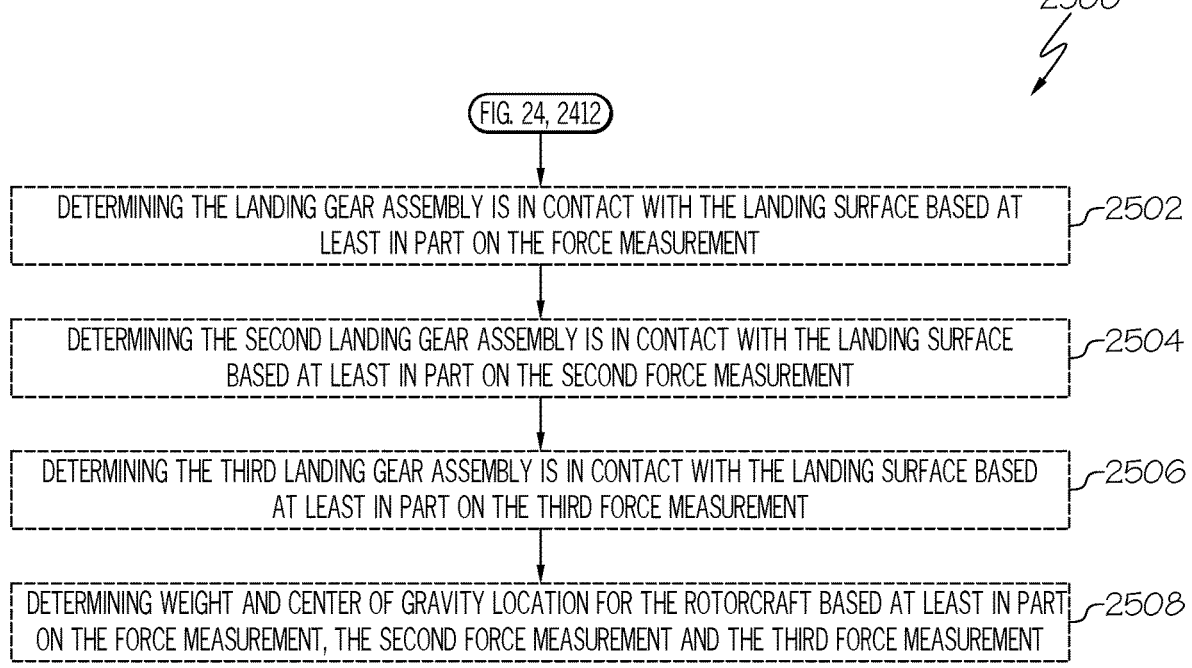
FIG. 25, in combination with FIGS. 11 and 24, is a flow diagram of still yet another example of a rotorcraft method.

FIG. 11 discloses an example of a rotorcraft method 1100. FIG. 12, in combination with FIG. 11, discloses another example of a rotorcraft method 1200. FIG. 13, in combination with FIG. 11, discloses yet another example of a rotorcraft method 1300. FIG. 14, in combination with FIGS. 11 and 13, discloses still another example of a rotorcraft method 1400. FIG. 15, in combination with FIG. 11, discloses still yet another example of a rotorcraft method 1500. FIG. 16, in combination with FIG. 11, discloses another example of a rotorcraft method 1600. FIG. 17, in combination with FIG. 11, discloses yet another example of a rotorcraft method 1700. FIG. 18, in combination with FIGS. 11 and 17, discloses still another example of a rotorcraft method 1800. FIG. 19, in combination with FIGS. 11, 17 and 18, discloses still yet another example of a rotorcraft method 1900. FIG. 20, in combination with FIGS. 11 and 17, discloses still another example of a rotorcraft method 2000. FIG. 21, in combination with FIGS. 11, 17 and 20, discloses still yet another example of a rotorcraft method 2100. FIG. 22, in combination with FIGS. 11, 17, 20 and 21, discloses another example of a rotorcraft method 2200. FIG. 23, in combination with FIGS. 11, 17, 20 and 21, discloses yet another example of a rotorcraft method 2300. FIG. 24, in combination with FIG. 11, discloses still another example of a rotorcraft method 2400. FIG. 25, in combination with FIGS. 11 and 24, discloses still yet another example of a rotorcraft method 2500. FIG. 26, in combination with FIGS. 11 and 24, discloses another example of a rotorcraft method 2600. FIG. 27, in combination with FIGS. 11, 24 and 26, discloses yet another example of a rotorcraft method 2700. FIG. 28, in combination with FIGS. 11, 24 and 26, discloses still another example of a rotorcraft method 2800.

With reference again to FIGS. 1, 2, 7 and 11, in one or more examples, a rotorcraft method 1100 (see FIG. 11) includes receiving 1102 a force signal 702 from a force sensor 104 of a shock absorber 102 in a landing gear assembly 100, 202 of a rotorcraft 200 in response to the force sensor 104 detecting a pressure of an incompressible fluid within the shock absorber 102. At 1104, a temperature signal 708 is received from a temperature sensor 106 of the shock absorber 102 in response to the temperature sensor 106 detecting a temperature of the incompressible fluid. At 1106, the force signal 702 and the temperature signal 708 are processed to determine a force measurement indicative of a static compression force within the shock absorber 102. In another example, the rotorcraft method 1100 also includes processing the force measurement to determine a vertical force measurement indicative of a static vertical force on a ground support assembly 108 of the rotorcraft 200.

With reference again to FIGS. 1, 2, 11 and 12, in one or more examples, a rotorcraft method 1200 (see FIG. 12) includes the method 1100 of FIG. 11. The method 1200 continues from 1106 to 1202 where a series of force measurements are determined during a takeoff sequence or a landing sequence by the rotorcraft 200. At 1204, the series of force measurements are compared to a predetermined force characteristic for the landing gear assembly 100, 202. At 1206, a health condition of the landing gear assembly 100, 202 is determined based at least in part on the comparing 1204. In another example of the rotorcraft method 1200, the health condition of the landing gear assembly 100, 202 includes an acceptable condition, a degraded condition, an out of tolerance condition or any other suitable health condition.

With reference again to FIGS. 1, 2, 7, 9, 11 and 13, in one or more examples, a rotorcraft method 1300 (see FIG. 13) includes the method 1100 of FIG. 11. The method 1300 continues from 1106 to 1302 where a position signal 710 is received from a position sensor 116 of an airframe linkage assembly 114 in the landing gear assembly 100, 202 in response to the position sensor 116 detecting movement of an axle 110 of a ground support assembly 108 in the landing gear assembly 100, 202 between compressed and uncompressed conditions of the shock absorber 102. The position signal 710 relating to a position of the axle 110. At 1304, the position signal 710 is processed in relation to a predetermined reference point on the rotorcraft 200 to determine a position measurement indicative of the position of the axle 110 in relation to positions between the compressed and the uncompressed conditions of the shock absorber 102. In another example, the method 1300 also includes determining 1306 a series of force measurements and a corresponding series of position measurements during a takeoff sequence or a landing sequence by the rotorcraft 200. At 1308, the series of force measurements and the series of position measurements are compared to a predetermined force versus position characteristic 902 for the landing gear assembly 100, 202. At 1310, a health condition of the landing gear assembly 100, 202 is determined based at least in part on the comparing 1308. In a further example, the health condition of the landing gear assembly 100, 202 includes an acceptable condition, a degraded condition, an out of tolerance condition or any other suitable health condition.

With reference again to FIGS. 1, 2, 11, 13 and 14, in one or more examples, a rotorcraft method 1400 (see FIG. 14) includes the method 1100 of FIG. 11 and the method 1300 of FIG. 13. The method 1400 continues from 1304 to 1402 where a series of position measurements are determined during a takeoff sequence or a landing sequence by the rotorcraft 200. At 1404, the series of position measurements are compared to a predetermined position characteristic for the landing gear assembly 100, 202. At 1406, a health condition of the landing gear assembly 100, 202 is determined based at least in part on the comparing 1404. In a further example, the health condition of the landing gear assembly 100, 202 includes an acceptable condition, a degraded condition, an out of tolerance condition or any other suitable health condition.

With reference again to FIGS. 1, 2, 8, 11, and 15, in one or more examples, a rotorcraft method 1500 (see FIG. 15) includes the method 1100 of FIG. 11. The method 1500 continues from 1106 to 1502 for determining whether a ground contact element 112 of a ground support assembly 108 in the landing gear assembly 100, 202 is in contact with a landing surface 208 or not in contact with the landing surface 208 based at least in part on the force measurement. The method 1500 continues from 1106 to 1504 for controlling 1504 flight dynamics 802 of the rotorcraft 200 in conjunction with a takeoff sequence or a landing sequence by the rotorcraft 200 based at least in part on the force measurement.

With reference again to FIGS. 1, 2, 7, 8, 11, and 16, in one or more examples, a rotorcraft method 1600 (see FIG. 16) includes the method 1100 of FIG. 11. The method 1600 continues from 1106 to 1602 where a position signal 710 is received from a position sensor 116 of an airframe linkage assembly 114 in the landing gear assembly 100, 202 in response to the position sensor 116 detecting movement of an axle 110 of a ground support assembly 108 in the landing gear assembly 100, 202 between compressed and uncompressed conditions of the shock absorber 102. The position signal 710 relating to a position of the axle 110. At 1604, the position signal 710 is processed in relation to a predetermined reference point on the rotorcraft 200 to determine a position measurement indicative of the position of the axle 110 in relation to positions between the compressed and the uncompressed conditions of the shock absorber 102. In another example, the method 1600 also includes determining 1606 whether a ground contact element 112 of the ground support assembly 108 in the landing gear assembly 100, 202 is in contact with a landing surface 208 or not in contact with the landing surface 208 based at least in part on the force measurement and the position measurement. In yet another example, the method 1600 also includes controlling 1608 flight dynamics 802 of the rotorcraft 200 in conjunction with a takeoff sequence or a landing sequence by the rotorcraft 200 based at least in part on the force measurement and the position measurement. In still another example, the method 1600 also includes determining 1610 whether a ground contact element 112 of the ground support assembly 108 in the landing gear assembly 100, 202 is in contact with a landing surface 208 or not in contact with the landing surface 208 based at least in part on the position measurement. In still yet another example, the method 1600 also includes controlling 1612 flight dynamics 802 of the rotorcraft 200 in conjunction with a takeoff sequence or a landing sequence by the rotorcraft 200 based at least in part on the position measurement.

With reference again to FIGS. 1, 2, 10, 11, and 17, in one or more examples, a rotorcraft method 1700 (see FIG. 17) includes the method 1100 of FIG. 11. The method 1700 continues from 1106 to 1702 where a second force signal 1002 is received from a second force sensor 104 of a second shock absorber 102 in a second landing gear assembly 100, 204 of the rotorcraft 200 in response to the second force sensor 104 detecting a pressure of an incompressible fluid within the second shock absorber 102. At 1704, a second temperature signal 1004 is received from a second temperature sensor 106 of the second shock absorber 102 in response to the second temperature sensor 106 detecting a temperature of the incompressible fluid. At 1706, the second force signal 1002 and the second temperature signal 1004 are processed to determine a second force measurement indicative of a second static compression force within the second shock absorber 102. In another example, the method 1700 also includes processing the second force measurement to determine a second vertical force measurement indicative of a second static vertical force on a second ground support assembly 108 of the rotorcraft 200.

With reference again to FIGS. 1, 2, 11, 17, and 18, in one or more examples, a rotorcraft method 1800 (see FIG. 18) includes the method 1100 of FIG. 11 and the method 1700 of FIG. 17. The method 1800 continues from 1106 to 1802 for determining whether a ground contact element 112 in a ground support assembly 108 of the landing gear assembly 100, 202 is in contact with a landing surface 208 or not in contact with the landing surface 208 based at least in part on the force measurement. The method 1800 continues from 1706 to 1804 for determining whether a second ground contact element 112 in a second ground support assembly 108 of the second landing gear assembly 100, 204 is in contact with the landing surface 208 or not in contact with the landing surface 208 based at least in part on the second force measurement.

With reference again to FIGS. 1, 2, 8, 11, 17, 18 and 19, in one or more examples, a rotorcraft method 1900 (see FIG. 19) includes the method 1100 of FIG. 11, the method 1700 of FIG. 17 and the method 1800 of FIG. 18. The method 1900 continues from 1802 and 1804 to 1902 during a landing sequence for the rotorcraft 200 that begins with the landing gear assembly 100, 202 and the second landing gear assembly 100, 204 not in contact with the landing surface 208. At 1902, the method 1900 determines the landing gear assembly 100, 202 comes into contact with the landing surface 208 based at least in part on the force measurement. At 1904, flight dynamics 802 of the rotorcraft 200 are controlled based at least in part on the force measurement and the second force measurement to bring the second landing gear assembly 100, 204 into contact with the landing surface 208 and to manage the static compression force within the shock absorber 102 to avoid or mitigate damage to the rotorcraft 200 due to the static compression force during the landing sequence. The method continues from 1802 and 1804 to 1906 during a takeoff sequence for the rotorcraft 200 that begins with the landing gear assembly 100, 202 and the second landing gear assembly 100, 204 in contact with the landing surface 208. At 1906, the method determines the landing gear assembly 100, 202 is no longer in contact with the landing surface 208 based at least in part on the force measurement. At 1908, flight dynamics 802 of the rotorcraft 200 are controlled based at least in part on the force measurement and the second force measurement to bring the second landing gear assembly 100, 204 out of contact with the landing surface 208 and to manage the second static compression force within the second shock absorber 102 to avoid or mitigate damage to the rotorcraft 200 due to the second static compression force during the takeoff sequence.

With reference again to FIGS. 1, 2, 7, 10, 11, 17, and 20, in one or more examples, a rotorcraft method 2000 (see FIG. 20) includes the method 1100 of FIG. 11 and the method 1700 of FIG. 17. The method 2000 continues from 1706 to 2002 where a position signal 710 is received from a position sensor 116 of an airframe linkage assembly 114 in the landing gear assembly 100, 202 in response to the position sensor 116 detecting movement of an axle 110 of a ground support assembly 108 in the landing gear assembly 100, 202 between compressed and uncompressed conditions of the shock absorber 102. The position signal 710 relating to a position of the axle 110. At 2004, the position signal 710 is processed in relation to a predetermined reference point on the rotorcraft 200 to determine a position measurement indicative of the position of the axle 110 in relation to positions between the compressed and the uncompressed conditions of the shock absorber 102. At 2006, a second position signal 1006 is received from a second position sensor 116 of a second airframe linkage assembly 114 in the second landing gear assembly 100, 204 in response to the second position sensor 116 detecting movement of a second axle 110 of a second ground support assembly 108 in the second landing gear assembly 100, 204 between compressed and uncompressed conditions of the second shock absorber 102. The second position signal 1006 relating to a position of the second axle 110. At 2008, the second position signal 1006 is processed in relation to a second predetermined reference point on the rotorcraft 200 to determine a second position measurement indicative of the position of the second axle 110 in relation to positions between the compressed and the uncompressed conditions of the second shock absorber 102.

With reference again to FIGS. 1, 2, 11, 17, 20 and 21, in one or more examples, a rotorcraft method 2100 (see FIG. 21) includes the method 1100 of FIG. 11, the method 1700 of FIG. 17 and the method 2000 of FIG. 20. The method 2100 continues from 2004 to 2102 for determining 2102 whether a ground contact element 112 in a ground support assembly 108 of the landing gear assembly 100, 202 is in contact with a landing surface 208 or not in contact with the landing surface 208 based at least in part on the force measurement and the position measurement. At 2104. The method 2100 continues from 2008 to 2104 for determining 2104 whether a second ground contact element 112 in a second ground support assembly 108 of the second landing gear assembly 100, 204 is in contact with the landing surface 208 or not in contact with the landing surface 208 based at least in part on the second force measurement and the second position measurement.

With reference again to FIGS. 1, 2, 8, 11, 17, 20, 21 and 22, in one or more examples, a rotorcraft method 2200 (see FIG. 22) includes the method 1100 of FIG. 11, the method 1700 of FIG. 17, the method 2000 of FIG. 20 and the method 2100 of FIG. 21. The method 2200 continues from 2102 and 2104 to 2202 during a landing sequence for the rotorcraft 200 that begins with the landing gear assembly 100, 202 and the second landing gear assembly 100, 204 not in contact with the landing surface 208. At 2202, the method determines the landing gear assembly 100, 202 comes into contact with the landing surface 208 based at least in part on the force measurement and the position measurement. At 2204, flight dynamics 802 of the rotorcraft 200 are controlled based at least in part on the force measurement, the position measurement, the second force measurement and the second position measurement to bring the second landing gear assembly 100, 204 into contact with the landing surface 208 and to manage the static compression force within the shock absorber 102 to avoid or mitigate damage to the rotorcraft 200 due to the static compression force during the landing sequence. The method 2200 continues from 2102 and 2104 to 2206 during a takeoff sequence for the rotorcraft 200 that begins with the landing gear assembly 100, 202 and the second landing gear assembly 100, 204 in contact with the landing surface 208. At 2206, the method 2200 determines 2206 the landing gear assembly 100, 202 is no longer in contact with the landing surface 208 based at least in part on the force measurement and the position measurement. At 2208, flight dynamics 802 of the rotorcraft 200 are controlled based at least in part on the force measurement, the position measurement, the second force measurement and the second position measurement to bring the second landing gear assembly 100, 204 out of contact with the landing surface 208 and to manage the second static compression force within the second shock absorber 102 to avoid or mitigate damage to the rotorcraft 200 due to the second static compression force during the takeoff sequence.

With reference again to FIGS. 1, 2, 8, 11, 17, 20, 21 and 23, in one or more examples, a rotorcraft method 2300 (see FIG. 23) includes the method 1100 of FIG. 11, the method 1700 of FIG. 17, the method 2000 of FIG. 20 and the method 2100 of FIG. 21. The method 2300 continues from 2102 and 2104 to 2302 during a landing sequence for the rotorcraft 200 that begins with the landing gear assembly 100, 202 and the second landing gear assembly 100, 204 not in contact with the landing surface 208. At 2302, the method 2300 determines the landing gear assembly 100, 202 comes into contact with the landing surface 208 based at least in part on the position measurement. At 2304, flight dynamics 802 of the rotorcraft 200 are controlled based at least in part on the position measurement and the second position measurement to bring the second landing gear assembly 100, 204 into contact with the landing surface 208 and to manage the static compression force within the shock absorber 102 to avoid or mitigate damage to the rotorcraft 200 due to the static compression force during the landing sequence. The method also continues from 2102 and 2104 to 2306 during a takeoff sequence for the rotorcraft 200 that begins with the landing gear assembly 100, 202 and the second landing gear assembly 100, 204 in contact with the landing surface 208. At 2306, the method 2300 determines the landing gear assembly 100, 202 is no longer in contact with the landing surface 208 based at least in part on the position measurement. At 2308, flight dynamics 802 of the rotorcraft 200 are controlled based at least in part on the position measurement and the second position measurement to bring the second landing gear assembly 100, 204 out of contact with the landing surface 208 and to manage the second static compression force within the second shock absorber 102 to avoid or mitigate damage to the rotorcraft 200 due to the second static compression force during the takeoff sequence.

With reference again to FIGS. 1, 2, 10, 11, and 24, in one or more examples, a rotorcraft method 2400 (see FIG. 24) includes the method 1100 of FIG. 11. The method 2400 continues from 1106 to 2402 where a second force signal 1002 is received from a second force sensor 104 of a second shock absorber 102 in a second landing gear assembly 100, 204 of the rotorcraft 200 in response to the second force sensor 104 detecting a pressure of an incompressible fluid within the second shock absorber 102. At 2402, a second temperature signal 1004 is received from a second temperature sensor 106 of the second shock absorber 102 in response to the second temperature sensor 106 detecting a temperature of the incompressible fluid. At 2406, the second force signal 1002 and the second temperature signal 1004 are processed to determine a second force measurement indicative of a second static compression force within the second shock absorber 102. At 2408, a third force signal 1008 is received from a third force sensor 104 of a third shock absorber 102 in a third landing gear assembly 100, 206 of the rotorcraft 200 in response to the third force sensor 104 detecting a pressure of an incompressible fluid within the third shock absorber 102. At 2410, a third temperature signal 1010 is received from a third temperature sensor 106 of the third shock absorber 102 in response to the third temperature sensor 106 detecting a temperature of the incompressible fluid. At 2412, the third force signal 1008 and the third temperature signal 1010 are processed to determine a third force measurement indicative of a third static compression force within the third shock absorber 102. In another example, the method 2400 also includes processing the second force measurement to determine a second vertical force measurement indicative of a second static vertical force on a second ground support assembly 108 of the rotorcraft 200 and processing the third force measurement to determine a third vertical force measurement indicative of a third static vertical force on a third ground support assembly 108 of the rotorcraft 200.

With reference again to FIGS. 1, 2, 11, 24 and 25, in one or more examples, a rotorcraft method 2500 (see FIG. 25) includes the method 1100 of FIG. 11 and the method 2400 of FIG. 24. The method 2500 continues from 2412 to 2502 during ground operations for the rotorcraft 200 in which rotors are powered down. At 2502, the landing gear assembly 100, 202 is determined to be in contact with a landing surface 208 based at least in part on the force measurement. At 2504, the second landing gear assembly 100, 204 is determined to be in contact with the landing surface 208 based at least in part on the second force measurement. At 2506, the third landing gear assembly 100, 206 is determined to be in contact with the landing surface 208 based at least in part on the third force measurement. At 2508, a current center of gravity location for the rotorcraft 200 is determined based at least in part on the force measurement, the second force measurement and the third force measurement.

With reference again to FIGS. 1, 2, 7, 10, 11, 24 and 26, in one or more examples, a rotorcraft method 2600 (see FIG. 26) includes the method 1100 of FIG. 11 and the method 2400 of FIG. 24. The method 2600 continues from 2412 to 2602 where a position signal 710 is received from a position sensor 116 of an airframe linkage assembly 114 in the landing gear assembly 100, 202 in response to the position sensor 116 detecting movement of an axle 110 of a ground support assembly 108 in the landing gear assembly 100, 202 between compressed and uncompressed conditions of the shock absorber 102, the position signal 710 relating to a position of the axle 110. At 2604, the position signal 710 is processed in relation to a predetermined reference point on the rotorcraft 200 to determine a position measurement indicative of the position of the axle 110 in relation to positions between the compressed and the uncompressed conditions of the shock absorber 102. At 2606, a second position signal 1006 is received from a second position sensor 116 of a second airframe linkage assembly 114 in the second landing gear assembly 100, 204 in response to the second position sensor 116 detecting movement of a second axle 110 of a second ground support assembly 108 in the second landing gear assembly 100, 204 between compressed and uncompressed conditions of the second shock absorber 102, the second position signal 1006 relating to a position of the second axle 110. At 2608, the second position signal 1006 is processed in relation to a second predetermined reference point on the rotorcraft 200 to determine a second position measurement indicative of the position of the second axle 110 in relation to positions between the compressed and the uncompressed conditions of the second shock absorber 102. At 2610, a third position signal 1012 is received from a third position sensor 116 of a third airframe linkage assembly 114 in the third landing gear assembly 100, 206 in response to the third position sensor 116 detecting movement of a third axle 110 of a third ground support assembly 108 in the third landing gear assembly 100, 206 between compressed and uncompressed conditions of the third shock absorber 102, the third position signal 1012 relating to a position of the third axle 110. At 2612, the third position signal 1012 is processed in relation to a third predetermined reference point on the rotorcraft 200 to determine a third position measurement indicative of the position of the third axle 110 in relation to positions between the compressed and the uncompressed conditions of the third shock absorber 102.

With reference again to FIGS. 1, 2, 11, 24, 26 and 27, in one or more examples, a rotorcraft method 2700 (see FIG. 27) includes the method 1100 of FIG. 11, the method 2400 of FIG. 24 and the method 2600 of FIG. 26. The method 2700 continues from 2612 to 2702 during ground operations for the rotorcraft 200 in which rotors are powered down. At 2702, the landing gear assembly 100, 202 is determined to be in contact with a landing surface 208 based at least in part on the force measurement and the position measurement. At 2704, the second landing gear assembly 100, 204 is determined to be in contact with the landing surface 208 based at least in part on the second force measurement and the second position measurement. At 2706, the third landing gear assembly 100, 206 is determined to be in contact with the landing surface 208 based at least in part on the third force measurement and the third position measurement. At 2708, a current center of gravity location for the rotorcraft 200 is determined based at least in part on the force measurement, the position measurement, the second force measurement, the second position measurement, the third force measurement and the third position measurement.

With reference again to FIGS. 1, 2, 11, 24, 26 and 28, in one or more examples, a rotorcraft method 2800 (see FIG. 28) includes the method 1100 of FIG. 11, the method 2400 of FIG. 24 and the method 2600 of FIG. 26. The method 2800 continues from 2612 to 2802 during ground operations for the rotorcraft 200 in which rotors are powered down. At 2802, the landing gear assembly 100, 202 is determined to be in contact with a landing surface 208 based at least in part on the position measurement. At 2804, the second landing gear assembly 100, 204 is determined to be in contact with the landing surface 208 based at least in part on the second position measurement. At 2806, the third landing gear assembly 100, 206 is determined to be in contact with the landing surface 208 based at least in part on the third position measurement. At 2808, a current center of gravity location for the rotorcraft 200 is determined based at least in part on the position measurement, the second position measurement and the third position measurement.

Examples of the landing gear assembly 100, rotorcraft 200 and rotorcraft methods 1100, 1200, 1300, 1400, 1500, 1600, 1700, 1800, 1900, 2000, 2100, 2200, 2300, 2400, 2500, 2600, 2700, 2800 may be related to or used in the context of rotorcraft manufacturing. Although a rotorcraft example is described, the examples and principles disclosed herein may be applied to other products in the aerospace industry and other industries, such as the automotive industry, the space industry, the construction industry and other design and manufacturing industries. Accordingly, in addition to rotorcraft, the examples and principles disclosed herein may apply to the detecting loads on shock absorbers and other equipment in various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component or hardware "configured to" perform a specified function is indeed capable of performing the specified function without any alteration, rather than merely having potential to perform the specified function after further modification. In other words, the system, apparatus, device, structure, article, element, component or hardware "configured to" perform a specified function is specifically selected, created, implemented, utilized, programmed and/or designed for the purpose of performing the specified function. As used herein, "configured to" denotes existing characteristics of a system, apparatus, structure, article, element, component or hardware that enable the system, apparatus, structure, article, element, component or hardware to perform the specified function without further modification. For purposes of this disclosure, a system, apparatus, device, structure, article, element, component or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1-3, 4A-B, and 5-10, referred to above, may represent functional elements, features or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1-3, 4A-B, and 5-10, referred to above, need be included in every example and not all elements, features and/or components described herein are necessarily depicted in each illustrative example. Accordingly, some of the elements, features and/or components described and illustrated in FIGS. 1-3, 4A-B, and 5-10 may be combined in various ways without the need to include other features described and illustrated in FIGS. 1-3, 4A-B, and 5-10, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1-3, 4A-B, and 5-10, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1-3, 4A-B, and 5-10 and such elements, features and/or components may not be discussed in detail herein with reference to each of FIGS. 1-3, 4A-B, and 5-10. Similarly, all elements, features and/or components may not be labeled in each of FIGS. 1-3, 4A-B, and 5-10, but reference numerals associated therewith may be utilized herein for consistency.

In FIGS. 11-28, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 11-28 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage or characteristic described in connection with an example is included in at least one example. Thus, discussion of features, advantages and similar language used throughout the present disclosure may, but does not necessarily, refer to the same example.

Figure 29:
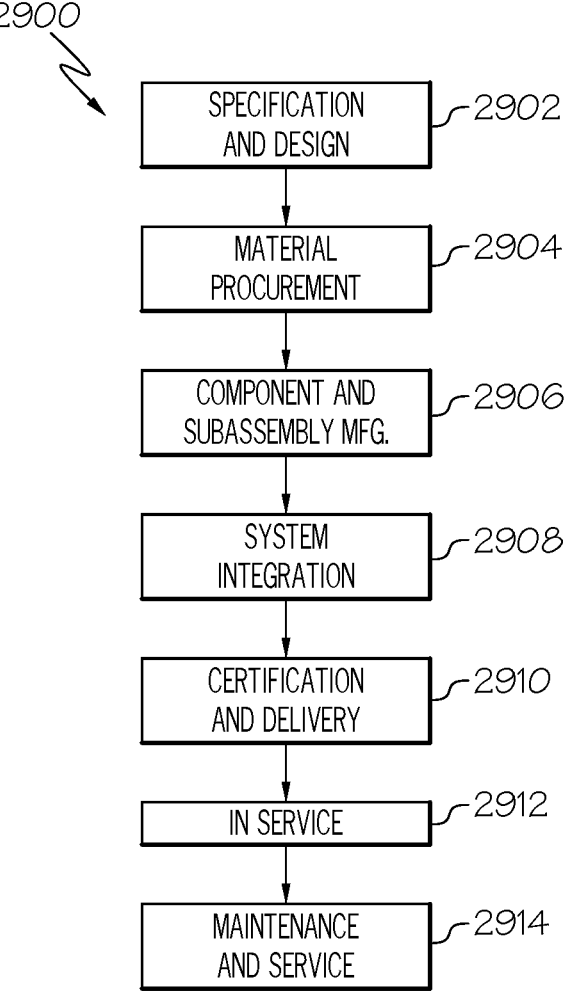
FIG. 29 is a block diagram of rotorcraft production and service methodology that implements one or more of the examples of rotorcraft methods disclosed herein.
Figure 30:
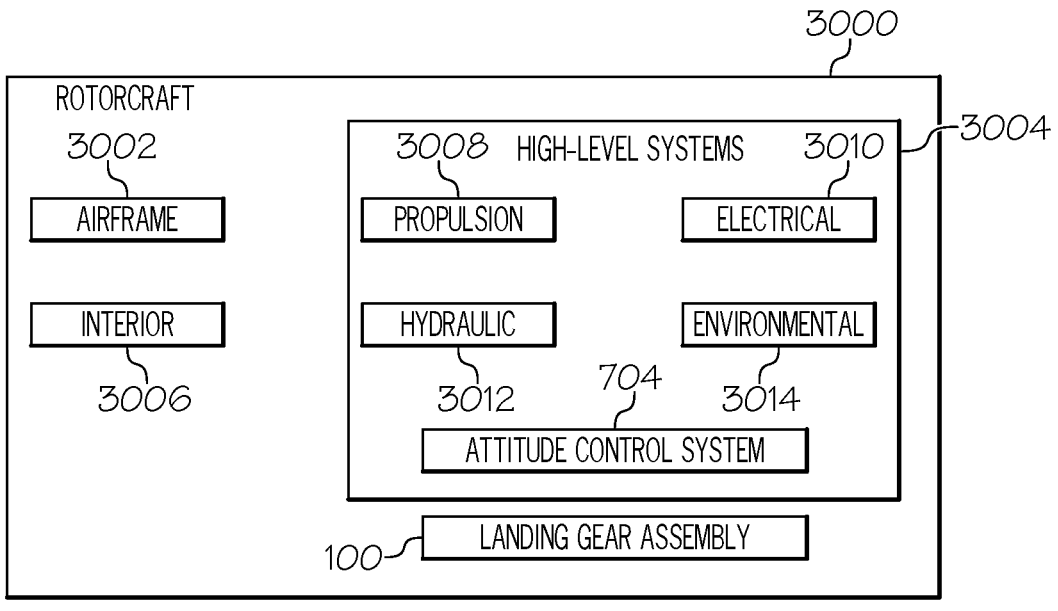
FIG. 30 is a schematic illustration of another example of a rotorcraft that incorporates one or more examples of landing gear assemblies disclosed herein.

Examples of the subject matter disclosed herein may be described in the context of rotorcraft manufacturing and service method 2900 as shown in FIG. 29 and rotorcraft 3000 as shown in FIG. 30. In one or more examples, the disclosed methods and systems for associating test data for a part under test with an end item coordinate system may be used in rotorcraft manufacturing. During pre-production, the service method 2900 may include specification and design (block 2902) of rotorcraft 3000 and material procurement (block 2904). During production, component and subassembly manufacturing (block 2906) and system integration (block 2908) of rotorcraft 3000 may take place. Thereafter, rotorcraft 3000 may go through certification and delivery (block 2910) to be placed in service (block 2912). While in service, rotorcraft 3000 may be scheduled for routine maintenance and service (block 2914). Routine maintenance and service may include modification, reconfiguration, refurbishment, etc. of one or more systems of rotorcraft 3000.

Each of the processes of the service method 2900 may be performed or carried out by a system integrator, a third party and/or an operator (e.g., a customer). For the purposes of this description, a system integrator may include, without limitation, any number of rotorcraft manufacturers and major-system subcontractors; a third party may include, without limitation, any number of vendors, subcontractors and suppliers; and an operator may be an airline, leasing company, military entity, service organization and so on.

As shown in FIG. 30, rotorcraft 3000 produced by the service method 2900 may include airframe 3002 with a plurality of high-level systems 3004 and interior 3006. Examples of high-level systems 3004 include one or more of propulsion system 3008, electrical system 3010, hydraulic system 3012 and environmental system 3014. Any number of other systems may be included. Although an aerospace example is shown, the principles disclosed herein may be applied to other industries, such as the automotive industry. Accordingly, in addition to rotorcraft 3000, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 2900. For example, components or subassemblies corresponding to component and subassembly manufacturing (block 2906) may be fabricated or manufactured in a manner similar to components or subassemblies produced while rotorcraft 3000 is in service (block 2912). Also, one or more examples of the system(s), method(s) or combination thereof may be utilized during production stages (block 2906 and block 2908), for example, by substantially expediting assembly of or reducing the cost of rotorcraft 3000. Similarly, one or more examples of the system or method realizations or a combination thereof, may be utilized, for example and without limitation, while rotorcraft 3000 is in service (block 2912) and/or during maintenance and service (block 2914).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the landing gear assemblies 100, rotorcraft 200 and rotorcraft methods 1100, 1200, 1300, 1400, 1500, 1600, 1700, 1800, 1900, 2000, 2100, 2200, 2300, 2400, 2500, 2600, 2700, 2800 have been shown and described, modifications may occur to those skilled in the art upon reading the specification. The present application includes such modifications and is limited only by the scope of the claims.

What is claimed is:

1. A landing gear assembly for a rotorcraft, comprising:
   a shock absorber comprising a force sensor to detect a pressure of an incompressible fluid within the shock absorber and a temperature sensor to detect a temperature of the incompressible fluid;
   a ground support assembly pivotally linked to the shock absorber and comprising an axle and a ground contact element rotationally or pivotally movable in relation to the axle; and
   an airframe linkage assembly pivotally linked to at least one of the shock absorber and the ground support assembly and comprising a position sensor to detect positions of the axle between positions associated with compressed and uncompressed conditions of the shock absorber.

2. The landing gear assembly of claim 1, the airframe linkage assembly further comprising a retract actuator with an extend position and a retract position, wherein the landing gear assembly is extended as the retract actuator reaches the extend position and the landing gear assembly is retracted as the retract actuator reaches the retract position.

3. The landing gear assembly of claim 1 wherein the compressed condition of the shock absorber indicates the ground support assembly is in contact with a landing surface after preload forces on the shock absorber are overcome.

4. The landing gear assembly of claim 1 wherein the uncompressed condition of the shock absorber indicates the ground support assembly is not in contact with a landing surface until preload forces on the shock absorber are overcome.

5. The landing gear assembly of claim 1 wherein the force sensor is configured to provide a force signal indicative of the pressure of the incompressible fluid within the shock absorber to an attitude control system in a fuselage of the rotorcraft.

6. The landing gear assembly of claim 5 wherein the temperature sensor is configured to provide a temperature signal indicative of the temperature of the incompressible fluid within the shock absorber to the attitude control system of the rotorcraft.

7. The landing gear assembly of claim 6 wherein the attitude control system is configured to process the force signal and the temperature signal to determine a force measurement indicative of a static compression force within the shock absorber.

8. The landing gear assembly of claim 7 wherein the attitude control system is configured to process the force measurement to determine a vertical force measurement indicative of a static vertical force on the ground support assembly.

9. The landing gear assembly of claim 7 wherein the attitude control system is configured to determine whether the ground contact element of the ground support assembly is in contact with a landing surface or not in contact with the landing surface based at least in part on the force measurement.

10. The landing gear assembly of claim 7 wherein the attitude control system is configured to control flight dynamics of the rotorcraft in conjunction with a takeoff sequence or a landing sequence by the rotorcraft based at least in part on the force measurement.

11. The landing gear assembly of claim 7 wherein the position sensor is configured to provide a position signal to the attitude control system of the rotorcraft relating to a position of the axle.

12. The landing gear assembly of claim 11 wherein the attitude control system is configured to process the position signal in relation to a predetermined reference point on the rotorcraft to determine a position measurement indicative of the position of the axle in relation to positions between the compressed and the uncompressed conditions of the shock absorber.

13. The landing gear assembly of claim 12 wherein the attitude control system is configured to process the force measurement and the position measurement to determine whether the ground contact element of the ground support assembly is in contact with a landing surface or not in contact with the landing surface.

14. The landing gear assembly of claim 12 wherein the attitude control system is configured to control flight dynamics of the rotorcraft in conjunction with a takeoff sequence or a landing sequence by the rotorcraft based at least in part on the force measurement and the position measurement.

15. The landing gear assembly of claim 12 wherein the attitude control system is configured to determine a series of force measurements and a corresponding series of position measurements during a takeoff sequence or a landing sequence by the rotorcraft, configured to compare the series of force measurements and the series of position measurements to a predetermined force versus position characteristic for the landing gear assembly and configured to determine a health condition of the landing gear assembly.

16. The landing gear assembly of claim 15 wherein the health condition of the landing gear assembly comprises at least one of an acceptable condition, a degraded condition and an out of tolerance condition.

17. The landing gear assembly of claim 1 wherein the position sensor is configured to provide a position signal to an attitude control system in a fuselage of the rotorcraft relating to a position of the axle.

18. The landing gear assembly of claim 17 wherein the attitude control system is configured to process the position signal in relation to a predetermined reference point on the rotorcraft to determine a position measurement indicative of the position of the axle in relation to positions between the compressed and the uncompressed conditions of the shock absorber.

19. A rotorcraft, comprising:
   a first landing gear assembly that supports a first portion of the rotorcraft while the first landing gear assembly is in contact with a landing surface, the first landing gear assembly comprising a first force sensor to detect a pressure of an incompressible fluid within a first shock absorber of the first landing gear assembly, a first temperature sensor to detect a temperature of the incompressible fluid within the first shock absorber and a first position sensor to detect positions of a first axle in a first ground support assembly of the first landing gear assembly between positions associated with a compressed condition and an uncompressed condition of the first shock absorber;
   a second landing gear assembly that supports at least a second portion of the rotorcraft while the second landing gear assembly is in contact with the landing surface, the second landing gear assembly comprising a second force sensor to detect a pressure of an incompressible fluid within a second shock absorber of the second landing gear assembly, a second temperature sensor to detect a temperature of the incompressible fluid within the second shock absorber and a second position sensor to detect positions of a second axle in a second ground support assembly of the second landing gear assembly between positions associated with a compressed condition and an uncompressed condition of the second shock absorber; and an attitude control system that controls flight dynamics of the rotorcraft based at least in part on a first force signal received from the first force sensor, a first temperature signal received from the first temperature sensor, a first position signal relating to a position of the first axle received from the first position sensor, a second force signal received from the second force sensor, a second temperature signal received from the second temperature sensor and a second position signal relating to a position of the second axle received from the second position sensor.

20. A rotorcraft method, comprising:

receiving a force signal from a force sensor of a shock absorber in a landing gear assembly of a rotorcraft in response to the force sensor detecting a pressure of an incompressible fluid within the shock absorber;

receiving a temperature signal from a temperature sensor of the shock absorber in response to the temperature sensor detecting a temperature of the incompressible fluid;

processing the force signal and the temperature signal to determine a force measurement indicative of a static compression force within the shock absorber; and receiving a position signal from a position sensor of an airframe linkage assembly in the landing gear assembly in response to the position sensor detecting positions of an axle of a ground support assembly in the landing gear assembly between positions associated with compressed and uncompressed conditions of the shock absorber; and processing the position signal in relation to a predetermined reference point on the rotorcraft to determine a position measurement indicative of a position of the axle in relation to positions associated with the compressed and the uncompressed conditions of the shock absorber.

* * * * *